United States Patent
Blohm et al.

(10) Patent No.: US 12,354,021 B2
(45) Date of Patent: Jul. 8, 2025

(54) CONTEXTUAL-BASED KNOWLEDGE ENTITY SUGGESTIONS

(71) Applicant: Microsoft Technology Licensing, LLC, Redmond, WA (US)

(72) Inventors: Sebastian Johannes Blohm, Munich (DE); Xiao Li, Stamford, CT (US); Nikita Voronkov, Bothell, WA (US); Hadi Kotaich, Bellevue, WA (US); Wenjin Xu, Bothell, WA (US); Kun Piao, Sammamish, WA (US); Dion Stephan Javellana Ong, New Haven, CT (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 250 days.

(21) Appl. No.: 18/075,284

(22) Filed: Dec. 5, 2022

(65) Prior Publication Data
US 2024/0185093 A1  Jun. 6, 2024

(51) Int. Cl.
  *G06N 5/022* (2023.01)
  *G06F 40/284* (2020.01)
  *G06F 40/30* (2020.01)

(52) U.S. Cl.
  CPC .......... *G06N 5/022* (2013.01); *G06F 40/284* (2020.01); *G06F 40/30* (2020.01)

(58) Field of Classification Search
  CPC ........ G06N 5/022; G06F 40/284; G06F 40/30
  See application file for complete search history.

(56) References Cited

U.S. PATENT DOCUMENTS 10,853,579 B2 * 12/2020 Laxman .................. G06F 40/30
10,878,174 B1 * 12/2020 Vontobel .......... G06Q 10/06398
(Continued)

FOREIGN PATENT DOCUMENTS

WO   WO-2021119064 A1 * 6/2021 ............. G06F 16/26

OTHER PUBLICATIONS

Automatic Detection of Machine Generated Texts: Need More Tokens (Year: 2022).*
(Continued)

*Primary Examiner* — Mohammad K Islam
(74) *Attorney, Agent, or Firm* — Han Gim; Newport IP, LLC

(57) ABSTRACT

A data processing system implements receiving a textual context inserted into a user interface element; receiving an indicator inserted into the user interface element after the textual context, the indicator indicating a desire to tag a topic from a plurality of topics included in a knowledge base; receiving one or more textual character inserted into the user interface element after the indicator; encoding, using a machine-learning (ML) model, the received textual context to generate at least one representation reflecting one or more meanings of the received textual context; decoding, using the ML model, the at least one representation to generate a plurality of tokens in response to the one or more meanings of the received textual context, the plurality of tokens corresponding with the at least one textual character and at least one of the topics of the plurality of topics; identifying one or more topics from the plurality of topics as recommended topics; and providing the identified recommended topics for display in a topic selection user interface element that enables selection of one recommended topic for insertion as the tag in the user interface element.

20 Claims, 15 Drawing Sheets

(56) References Cited

U.S. PATENT DOCUMENTS

| | | | |
|---|---|---|---|
| 11,481,434 B1* | 10/2022 | Venti .................. | G06F 40/30 |
| 2003/0115191 A1* | 6/2003 | Copperman ...... | G06F 16/90332 |
| | | | 707/E17.139 |
| 2018/0077101 A1* | 3/2018 | Desouza Sana ..... | G06Q 10/107 |
| 2019/0108228 A1* | 4/2019 | Zeng ................ | G06F 16/24522 |
| 2021/0377206 A1 | 12/2021 | Nizar et al. | |
| 2023/0134791 A1* | 5/2023 | Londeree ................ | G06F 16/93 |
| | | | 706/50 |

OTHER PUBLICATIONS

A Review on Large Language Models: Architectures, Applications, Taxonomies, Open Issues and Challenges (Year: 2024).*
Kocar, Karl, "Surfacing Viva Topics using hashtags", Retrieved From: https://www.youtube.com/watch?v=CUI_9kxxlAs, Aug. 5, 2021, 4 Pages.
Cao, et al., "Autoregressive Entity Retrieval", In Repository of arXiv:2010.00904v3, Mar. 24, 2021, 20 Pages.
Anonymous, "Trie—Wikipedia", Nov. 30, 2022, Retrieved from https://web.archive.org/web/20221130173913/ https://en.wikipedia.org/wiki/Trie, pp. 1-12.
International Search Report and Written Opinion received for PCT Application No. PCT/US23/035563, Feb. 7, 2024, 14 pages.

* cited by examiner

CONTEXTUAL-BASED KNOWLEDGE ENTITY SUGGESTIONS

BACKGROUND

Many organizations, such as but not limited to corporations, educational institutions, and governmental entities, utilize knowledge mining and knowledge sharing products to collect topics of interest within the organization. Topics, which may also be referred to as entities or concepts, of interest can include organization-specific products, teams, policies, and the like. The entirety of the collected entities or concepts forms an organization's knowledge base. Knowledge about the collected entities in the knowledge base can be shown to users in the organization in the form of entity pages, entity cards, and the like in various tools. In many large organizations, the number of entities in the knowledge base quickly grows to generate significantly large knowledge repositories. As a result, finding content in such repositories that fits a user's intention can be challenging. To help remedy this problem, names can be associated with the entities in the knowledge base to help identify the entities. The names can be used to search for and/or provide topic recommendations to users. For example, a user can type the first one or first few characters of an entity name, and a list of entities in the knowledge base that start with the entered characters can be presented to the user.

When the number of entities in the knowledge base is significantly large, however, searching for knowledge entities by their first character(s) can result in a large number of recommendations. Moreover, many of the recommendations can be unrelated to the user's intent and as such not useful. As a result, the user is often presented with an overwhelming number of entities and can have difficulty identifying which names are relevant to their particular needs. On the other hand, making relevant entity recommendations can increase user productivity and thus result in an improved user experience. Suggesting relevant topics from a knowledge base is, however, a challenging undertaking. Hence, there is a need for improved systems and methods for providing suggested topics from a knowledge base that are relevant to the user's context.

SUMMARY

In one general aspect, the instant disclosure describes a data processing system having a processor and a memory in communication with the processor, where the memory comprises executable instructions that, when executed by the processor, cause the data processing system to perform multiple functions. These functions include receiving an indicator inserted into the user interface element after the textual context, the indicator indicating a desire to tag a topic from a plurality of topics included in a knowledge base; receiving at least one textual character inserted into the user interface element after the indicator; encoding, using a machine-learning (ML) model, the received textual context to generate at least one representation reflecting one or more meanings of the received textual context; decoding, using the ML model, the at least one representation to generate a plurality of tokens in response to the one or more meanings of the received textual context, the plurality of tokens corresponding with the at least one textual character and at least one of the topics of the plurality of topics; identifying one or more topics from the plurality of topics as recommended topics; and providing the identified recommended topics for display in a topic selection user interface element that enables selection of one recommended topic for insertion as the tag in the user interface element.

In another general aspect the instant disclosure describes a method for providing topic recommendations. The method includes receiving a textual context inserted into a user interface element; receiving an indicator inserted into the user interface element after the textual context, the indicator indicating a desire to tag a topic from a plurality of topics included in a knowledge base; receiving at least one textual character inserted into the user interface element after the indicator; providing the textual context, the at least one character and a prefix tree data structure representing the plurality of topics as inputs to a trained machine-learning (ML) model; receiving as an output of the trained ML model one or more topics from the plurality of topics as identified recommended topics; and providing the identified recommended topics for display in a topic selection user interface element that enables selection of one recommended topic for insertion as the tag in the user interface element.

In yet another general aspect, the instant disclosure describes a non-transitory computer readable medium on which are stored instructions that when executed cause a programmable device to perform functions of receiving a textual context inserted into a user interface element; receiving an indicator inserted into the user interface element after the textual context, the indicator indicating a desire to tag a topic from a plurality of topics included in a knowledge base; receiving at least one textual character inserted into the user interface element after the indicator; encoding, using a machine-learning (ML) model, the received textual context to generate at least one representation reflecting one or more meanings of the received textual context; decoding, using the ML model, the at least one representation to generate a plurality of tokens in response to the one or more meanings of the received textual context, the plurality of tokens corresponding with the at least one textual character and at least one of the topics of the plurality of topics; identifying one or more topics from the plurality of topics as recommended topics; and providing the identified recommended topics for display in a topic selection user interface element that enables selection of one recommended topic for insertion as the tag in the user interface element.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
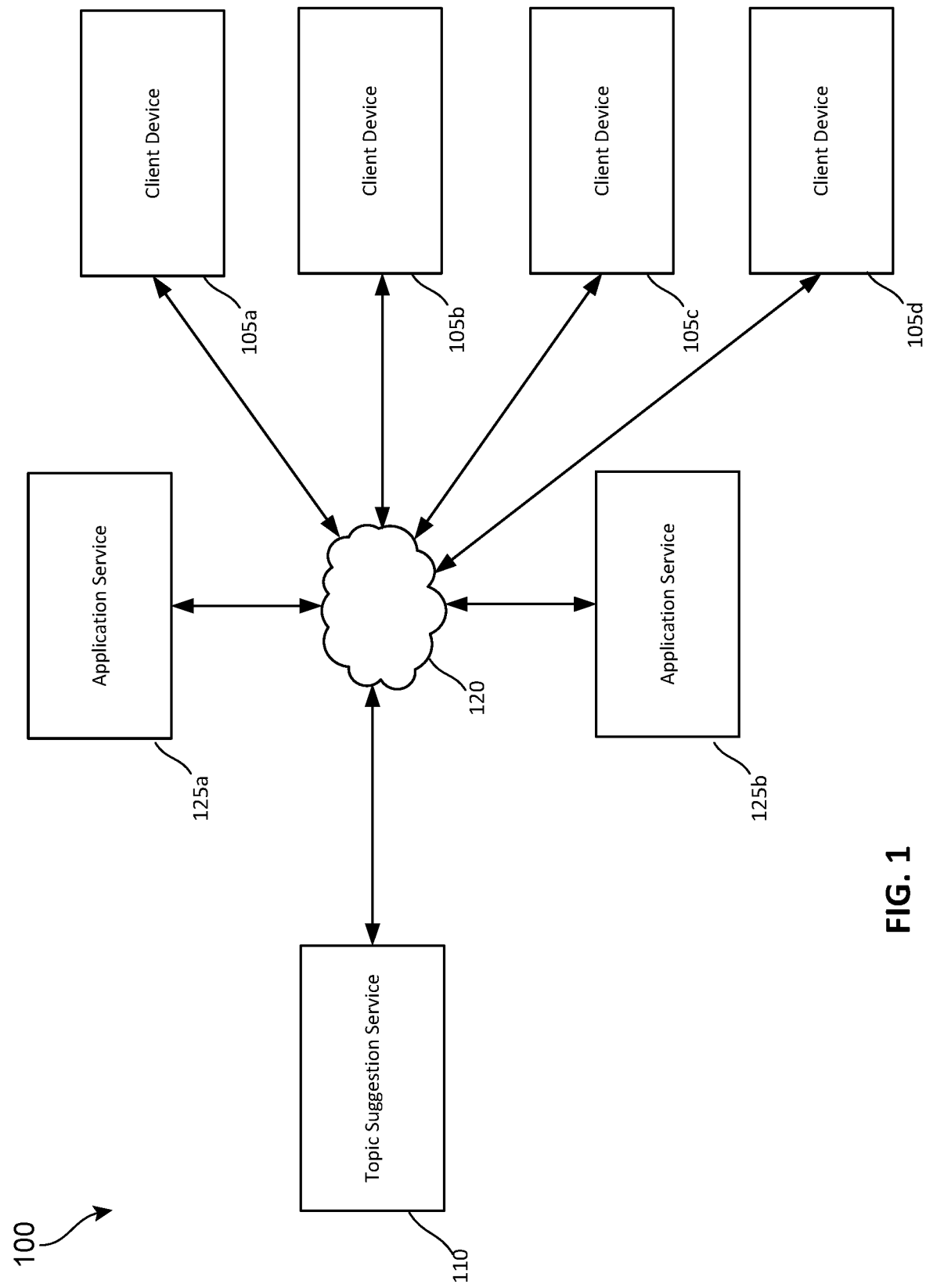
FIG. 1 is a diagram showing an example computing environment in which the techniques disclosed herein for providing suggested topics can be implemented.

Language models can be used to predict the next word in an insertion sequence. For example, when the user enters an incomplete sentence in an email or a text message, machine-learning (ML) models can be used to predict the next word in the sequence. However, the ML models that are used to predict the next word in such sequences are trained based on the words in a given language (e.g., words of the English language) and take into account factors such as grammar and user context. These models cannot be used to predict an entity from an organization knowledge base, because organization-specific entities do not correspond with the normal words of a given language. For example, the term "excel" has a different meaning in the English language than the term "Excel" does for Microsoft®. Thus, use of the existing language models for predicting entities from a knowledge base can result in inaccurate predictions. Thus, there exists a technical problem of lack of a mechanism for predicting an entity from a knowledge base based on an insertion sequence.

Furthermore, when searching for an entity from a knowledge base, the users often use an indicator (e.g., #) to indicate their desire to insert a tag associated with an entity of the knowledge base and then begin to insert characters after the indicator. While mechanisms exist that can search for entities in the knowledge base based on the inserted characters, those mechanisms can result in a display of numerous recommendations (e.g., all entities that start with the letter v). These mechanisms do not take into account both the context of the inserted textual content and the characters inserted after the indicator. As a result, the user is presented with an overwhelming number of recommendations, which is often difficult to review and use. Thus, there exists another technical problem of lack of mechanisms for considering both characters inserted after an indicator and the textual context of the insertion sequence inserted before the indicator into account in predicting entities from a knowledge base.

To address these technical problems and more, this disclosure provides techniques for providing entity recommendations from a knowledge base. These techniques provide a technical solution to the problem of a lack of mechanisms for taking both characters typed after an indicator and textual content into account in suggesting entity recommendations from a knowledge base. The entity recommendations are determined by using a generative ML model that takes into account text inserted before an indicator as well as tokens generated to represent entities from a knowledge base. This involves utilizing a generative model that generates entity names token by token based on an encoder/decoder paradigm. The model starts by encoding the inserted textual context. During the encoding phase, the textual context is presented to the model in a way that allows it to compute a numeric representation reflecting the meaning of what has been written. The decoding/generation phase is then constrained to such tokens that form entity names from a knowledge base. Thus, the decoding process is limited to generating only text sequences that correspond to names of entities in the knowledge base and furthermore match the characters typed after the indicator. In this manner, entities that are relevant to the textual context and the inserted characters can be predicted. The predicted entities can then be provided as entity recommendations to the user in a user interface element.

In some implementations, the technical solution takes into account infrastructure constraints that arise from serving many different users in an organization when multiple user attempt to search for entities in the knowledge base. For example, host machines for neural network models require processing infrastructure that is scarce and must be well utilized. As a result, there may be a need for utilizing centralized computing capability that does not have the organization data available on the same machine. To ensure efficient use of computing systems in processing entity recommendation requests, the generation, and processing of prefix tress are divided into sub-areas that are transferred between various types of computers, as needed. A technical benefit of this approach is that it makes more efficient use of computing resources used in processing entity recommendation requests. These and other technical benefits of the techniques disclosed herein will be evident from the discussion of the example implementations that follow.

As used herein, the terms "entity," "concept", and "topic" refer to subject matters that are included in a knowledge base. These terms are used interchangeably in this disclosure. Each entity in the knowledge base may be associated with one or more names.

FIG. 1 is a diagram showing an example computing environment 100 in which the techniques disclosed herein for providing topic recommendations can be implemented. The computing environment 100 includes a topic suggestion service 110 and application services 125a and 125b. The example computing environment also includes a plurality of client devices, such as client devices 105a, 105b, 105c, and 105d. The client devices 105a, 105b, 105c, and 105d, the application services 125a and 125b, and the topic suggestion service 110 communicate via the network 120. Additional details of the topic suggestion service 110, the application services 125a and 125b, and client devices 105a, 105b, 105c, and 105d are discussed in the examples which follow.

The topic suggestion service 110 can be implemented as a cloud-based service or set of services. The topic suggestion service 110 is configured to provide topic recommendations that are associated with electronic content items created or modified using the application services 125a and 125b. The topic suggestion service 110 includes means for identifying topic items and means for providing topic recommendations to a user searching for a topic or topics to associate with an electronic content item that the user is creating or modifying using the application services 125a and 125b. Additional details of these features are described with respect to FIG. 2.

The application services 125a and 125b provide one or more cloud-based or network-based services for the computing devices 105a-105d. For example, the application services 125a and 125b can provide a word processing application, a presentation application, project management software, a communications platform, a collaboration platform, a content sharing platform, a content creation platform, social messaging platform, and/or other services that are accessible to users via the computing devices 105a-105d and allow the users to communicate and/or consume, create, share, collaborate on, and/or modify content. Other types of services can be provided by the application services 125a and 125b in addition to or instead of these services. The services provided by the application services 125a and 125b can be accessed via a native application on a computing device, via an online application configured to communicate with the application services 125a and 125b, via other means, or via a combination thereof.

The application services 125a and 125b are also configured to allow users of the client devices 105a-105d to obtain topic recommendations from the topic suggestion service 110 and to associate one or more topics with content being created and/or modified using the application services 125a and 125b. The examples which follow describe how the topic suggestion service 110 creates topic recommendations for users and provides these recommendations to the users in the application services 125a and 125b.

The client devices 105a, 105b, 105c, and 105d are computing devices that can be implemented as a portable electronic device, such as a mobile phone, a tablet computer, a laptop computer, a portable digital assistant device, a portable game console, and/or other such devices. The client devices 105a-105d can also be implemented in computing devices having other form factors, such as a vehicle onboard computing system, a video game console, a desktop computer, and/or other types of computing devices. Each of the client devices 105a-105d can have different capabilities based on the hardware and/or software configuration of the respective client device. While the example implementation illustrated in FIG. 1 includes four client devices, other implementations can include a different number of client devices. Furthermore, the topic suggestion service 110 is shown as being implemented as a separate service from the application services 125a and 125b. However, the topic suggestion service 110 can be implemented as part of the same cloud-based set of services as one or more of the application services 125a and 125b.

Figure 2:
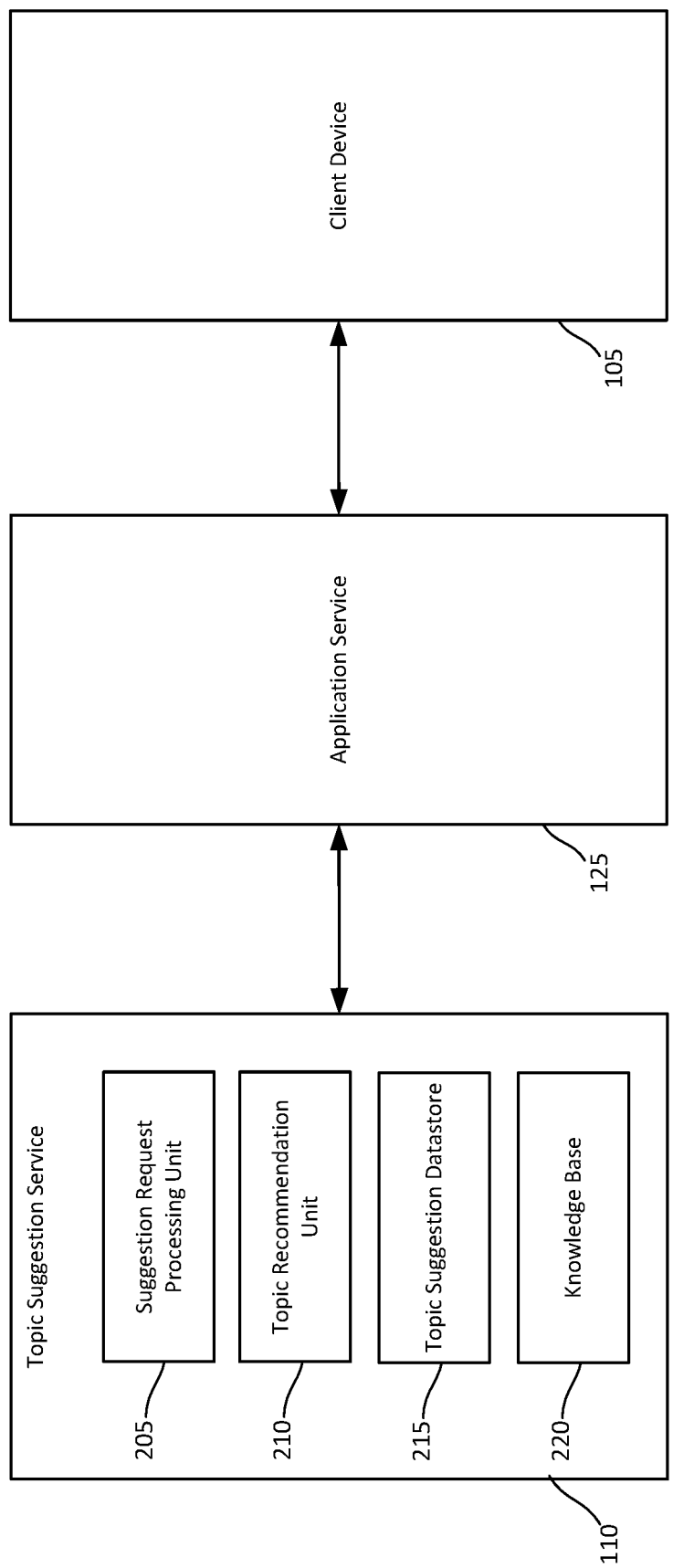
FIG. 2 is a diagram showing additional details of the topic suggestion service shown in FIG. 1.

FIG. 2 is a diagram showing additional details of the topic suggestion service 110 shown in FIG. 1. The topic suggestion service 110 includes a suggestion request processing unit 205, a topic determination unit 210, a topic suggestion datastore 215, and a knowledge base 220. The suggestion request processing unit 205 is configured to receive requests from an application service, such as the application services 125a and 125b, and/or from a client device 105, such as the client devices 105a-105d. The request can include user input that is used to formulate queries for topic recommendations that will be presented to the user. Examples of how the query can be formulated are provided in the examples which follow. The topic determination unit 210 is configured to determine multiple topic recommendations that can be presented to the user. The topic recommendations are determined by analyzing various textual contexts of an insertion sequence as well as one or more characters inserted after an indicator.

The knowledge base 220 and the topic suggestion datastore 215 are used to store topic information. The knowledge base 220 is a persistent datastore that is used to store topic information and other information for the organization, such as topic names, topic information, topic descriptions, and topic explementary notes. The topic information for an organization can be derived from content associated with multiple users across the organization. The knowledge base 220 can be populated with topic data by analyzing content associated with the organization using one or more machine learning models and/or rules-based models configured to identify tokens representing the content and to identify one or more topics associated with the tokens. The knowledge base 220 can also be populated and/or created manually. In some implementations, the knowledge base 220 includes a summarized definition for one or more topics and the summarized definitions can be presented to users in the form of topic pages or topic cards. While the knowledge base 220 is shown as being a part of the topic suggestion service 110, in some implementations, the knowledge base 220 is separated from the topic suggestion service 110. In fact, in some implementations, the knowledge base 220 is stored in an organization specific knowledge base and is stored in the organization's computer environment, while the topic suggestion service is a cloud-based service offered by another organization.

The topic suggestion datastore 215 is a persistent datastore which is used to store topic suggestion information. The topic suggestion information is output by the topic determination unit 210 and is derived from the topics included in the knowledge base 220. The suggestion request processing unit 205 can be configured to access the topic suggestion information stored in the topic suggestion datastore 215 to obtain topic recommendations that can be presented to users in response to a topic suggestion request. The determination of topic recommendations to include as topic suggestions is discussed in detail in the examples which follow.

Figure 3:
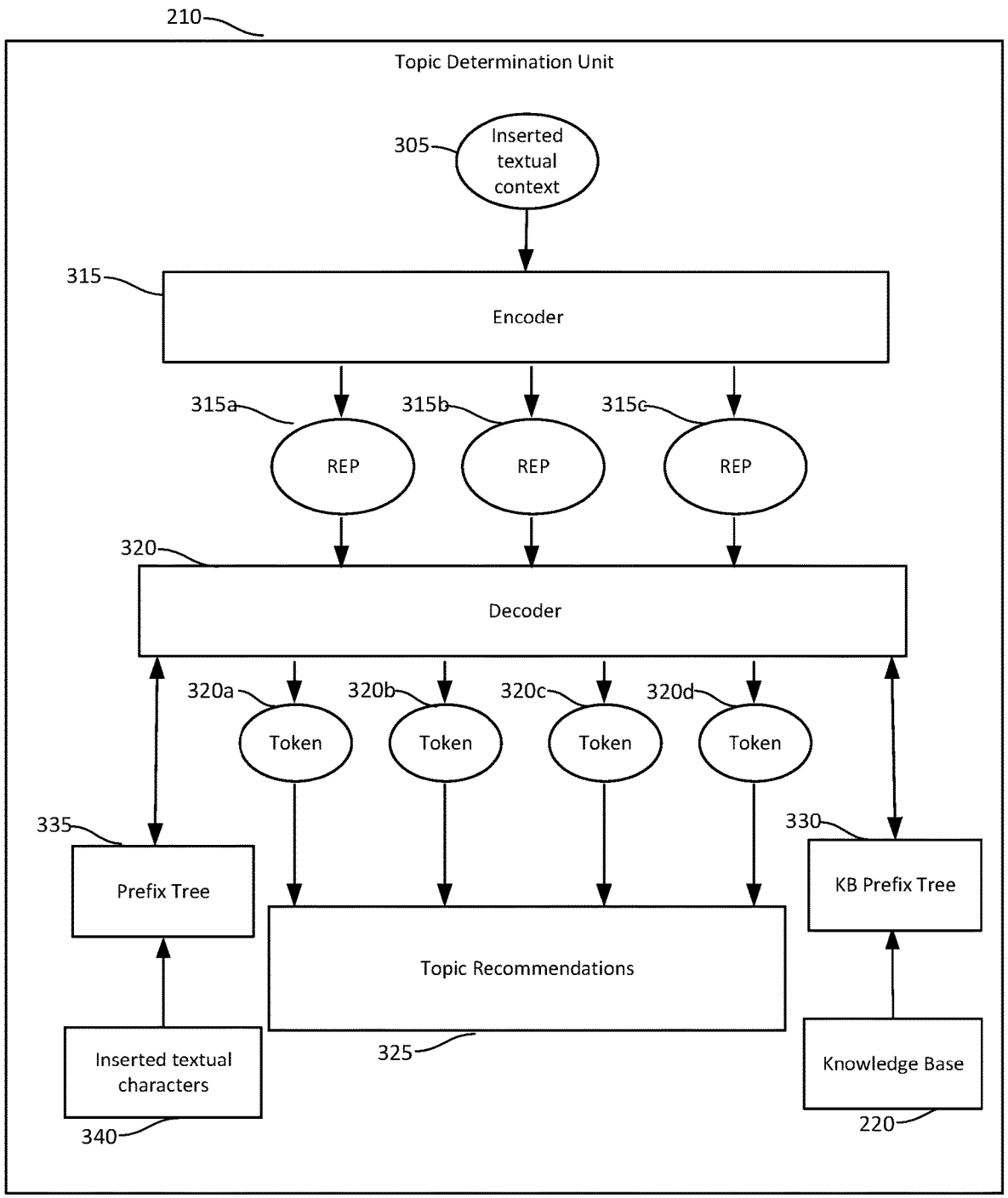
FIG. 3 is a diagram showing additional details of the topic determination unit of the topic suggestion service shown in FIG. 2.

FIG. 3 is a diagram showing an example implementation of the topic determination unit 210. The topic determination unit 210 can be configured to analyze textual content and provide topic recommendations. In the example shown in FIG. 3, the topic determination unit 210 is configured to obtain a textual context 305 received from a client device 105 through application service 125 or via a native application of the client device 105. For example, a user can insert (e.g., by typing, writing, translating from a recording, or the like) textual context into an insertion sequence in a user interface element created by application service 125 or displayed by a native application of the client device 105. After the textual context has been inserted, the topic determination unit 210 may receive the inserted textual context 305 upon specific user action such as insertion of an indicator followed by one or more characters (e.g., #followed by one or more letters). The inserted textual context 305 can include various lengths of textual content, such as one or more characters, sentences, or paragraphs. FIGS. 5A-E and 6A-6D illustrated more detail about inserting textual context via a user interface of an application.

To begin, the inserted textual context 305 is received by the topic determination unit 210 and is inputted into an encoder 315 to generate representations (REPs) 315a, 315b, and 315c. Data other than textual context 305, such as image data, audio data, or other signal data, can also be received by the topic determination unit 210 as input data alone or otherwise used together with the textual context 305 as input into the encoder 315. These representations generally reflect the meaning of the inserted textual context. The encoder 315 can be powered by one or more ML algorithms. Note that the number of characters or words does not necessarily equal the number of REPs. For example, in FIG. 3, the number of REPs (315a, 315b, and 315c) may be less than the number of input characters if the inserted textual context 315 consists of five characters. In other examples, however, they can be equal. Each REP (315a, 315b, or 315c) can reflect the meaning of the inserted textual context 315 individually or collectively. In a particular implementation, the encoder 315 is a bidirectional encoder implemented by a bidirectional encoder representations from transformers (BERT) model used for natural language processing (NLP). In other implementations, other models such as GPT2, XLNet, ROBERTa, ALBERT, DistilBERT, or the like, are employed.

The BERT model can be trained for generating tokens used in NLP for performing various language processes depending on applications. For example, the BERT model can be configured to predict characters, words, or sentences that will likely be presented next based on the tokens generated by the encoder 315. The bidirectional encoder 315 can be derived from a pre-trained BERT model with training data gathered from, but not required or limited to, the knowledge base 220 within an organization containing knowledge about topics of interest. In some implementations, unlabeled training data is used in training the BERT model in a semi-supervised ML approach. In some examples, to improve the training of the pre-trained BERT model, training data relating to specific areas or domains is used in the re-training of the pre-trained BERT model with labeled training data in order to improve the accuracy of the model. In some examples, an organization-based knowledge base 220 is used as labeled training data to train the BERT model. Thus, the bidirectional encoder 315 can be associated with the specific areas or domains from the organization-based knowledge base 220.

In addition, various transformations can be applied to the training data when training the BERT model. The transformations may include sentence permutation, and document rotation. The sentence permutation transformation can include permutating the sentences from the textual context for the BERT model to learn the logical entailment of sentences. The document rotation transformation can include rearranging characters to start with a random character and appending other characters at the end of the sentence, such that, the BERT model can learn insights into how the sentences in the textual context are typically arranged and what the beginning or ending of the textual context looks like. Thus, a pre-trained model, by these transformations, can be trained comprehensively with training data to provide the encoder 315 for generating the REPs 315a, 315b, and 315c.

The encoder 315 can generate REPs 315a, 315b, and 315c based on the inserted textual context 305. Specifically, the bidirectional encoder 315 is able to identify relevance by computing relations between characters, words, and sentences in the inserted textual context 305 to determine REPs 315a, 315b, and 315c that reflect the meaning of the inserted textual context 305. The generated REPs 315a, 315b, and 315c will then be provided to the decoder 320 for further processing to generate tokens 320a, 320b, 320c, and 320d. In some implementations, the decoder 320 is an autoregressive decoder 320 used to predict a variable from among multiple variables based on the correlations among them.

Hence, in some examples, the autoregressive decoder 320 can use tokens to predict the next token during the decoding phase. For example, the decoder 320 determines tokens 320a, 320b, and 320c based on the REPs 315a, 315b, and 315c, by using the BERT model. The decoder 320 will then continue to predict the next token 320d based on the tokens 320a, 320b, and 320c. The predicted token 320d herein represent character(s) or word(s) that are likely to be presented after the string of the inserted textual context 305.

In some implementations, the decoder 320 makes use of a prefix tree 335 to generate tokens that match the characters inserted by the user after an indicator (e.g., after #). This is achieved by generating the prefix tree 335 from the inserted textual characters 340. A prefix tree data structure is often used to store character strings into a tree data structure. The strings of characters may consist of several words, sentences, or other textual contents. The prefix tree, also referred to as a trie, can be used in searching for a query by locating a matching node related to the query as a start node and traversing the trie from the start node to its root nodes (child nodes). In this way, using the trie will significantly reduce the consumption of time and computing resources for searching for a topic of interest.

The prefix tree 335 is a data structure of names having a prefix that matches the characters inserted by the user after an indicator (inserted textual characters 340). The inserted indicator by the user indicates that the user is attempting to tag one or more topics of interest by a selection manner provided by the application, such as a selection list displayed upon insertion of the indicator. In some examples, the user can insert "#" as an indicator to request the application to display a list of suggested topics via the user interface of the application. Moreover, the user can insert one or more characters 340 after the indicator "#" to specify which topic from the list of topics the user is looking for. For example, if textual character 330 "ven" is inserted after the indicator "#," the user will then be provided a list of topics that start with the characters "ven" (e.g., ventilator, veneration, ventricose, venom, venue, etc.). The decoder makes use of this prefix tree 335 to ensure that the characters inserted by the user are taken into account when generating the tokens 320a-320d.

Furthermore, to ensure that the names are selected such that they correspond to the topics of the knowledge base, the decoder 320 makes use of a second prefix tree, which is the KB prefix tree 330. The KP prefix tree 300 is used to store topic names (or tags) from the knowledge base 220 as strings of characters. This is achieved by restricting the tokens that are generated based on the inserted characters to those that exist in the KB prefix tree 330. In this manner, the KP prefix tree 300 can serve two purposes. First, the user can quickly search for a topic of interest from the knowledge base 220 via the trie. Second, the KB prefix tree 330 can serve as a filter to screen out the topics of interest by looking up the nodes matching the inserted characters following the indicator (e.g., #). In this way, the number of suggested topics presented to the user is significantly reduced so that topics that are most likely to be the topics of interest can be provided to the user via the application. For example, when the user inserts the character "ven" following the indicator "#" in the application, the application will detect the inserted character "ven" and allow the user to retrieve all suggested topics from the KB prefix tree 330 that start with the character "m" by selecting prefix node having character "ven" and its child nodes from the trie. However, because the decoder uses the representations provided by the decoder, the inserted textual content 305 is also taken into account. For example, if the inserted textual context 305 is the phrase "This summer we are going to" followed by "#ven", the decoder selects a node of the KB prefix tree that corresponds to a place starting with the letters "ven" (e.g., Venice). This results in the ability to quickly provide the user with a list of suggested topics matching the inserted character 340 (e.g., character "ven") while considering the inserted textual context 305. The tokens that satisfy these conditions are then provided as top recommendations 325.

In this manner, the topic determination unit 210 takes both the inserted textual context 305 and the textual characters inserted after an indicator (e.g., #) into account to determine a list of topics to be presented to the user. Thus, the decoder 320 generates tokens that correspond to knowledge base topics that are considered relevant to the inserted textual context 305 and match the inserted character 330. The topic recommendations 325 are presented to the user via the user interface of the application. In some implementations, user specific information such as user preferences or user history of selected topics is used to rank the identified topic recommendations for display to the user.

One of the issues with providing topic recommendations quickly for multiple users in an organization is efficient processing of topic recommendation requests. That is because the knowledge base is often stored in organization specific data stores (e.g., object store). The topic suggestion service that processes the topic suggestion requests, however, can be a cloud-based server that is provided by a third-party service. Furthermore, the list of available suggestions depends on the per-organization knowledge base at the time of use and is therefore highly dynamic over time and organization-dependent. Moreover, linguistic properties on likely next words are to a large extend universal. At the same time, it is not computationally efficient to learn and store all linguistic knowledge separately per organization. Further, host machines for neural network models require per-language model compute infrastructure (e.g., graphical processing units (GPUs) that is scarce and has to be well utilized. As a result, it is more efficient to use centralized computer capability that does not have the per-organization data available on the same machine. However, it is not efficient to send an entire list of knowledge base topics between different machines for every topic request. To make more efficient use of computing resources, the prefix trees are divided into sub-areas that are transferred between the organization data stores storing the knowledge base and the processing machines that process the models, as processing requires.

Figure 4:
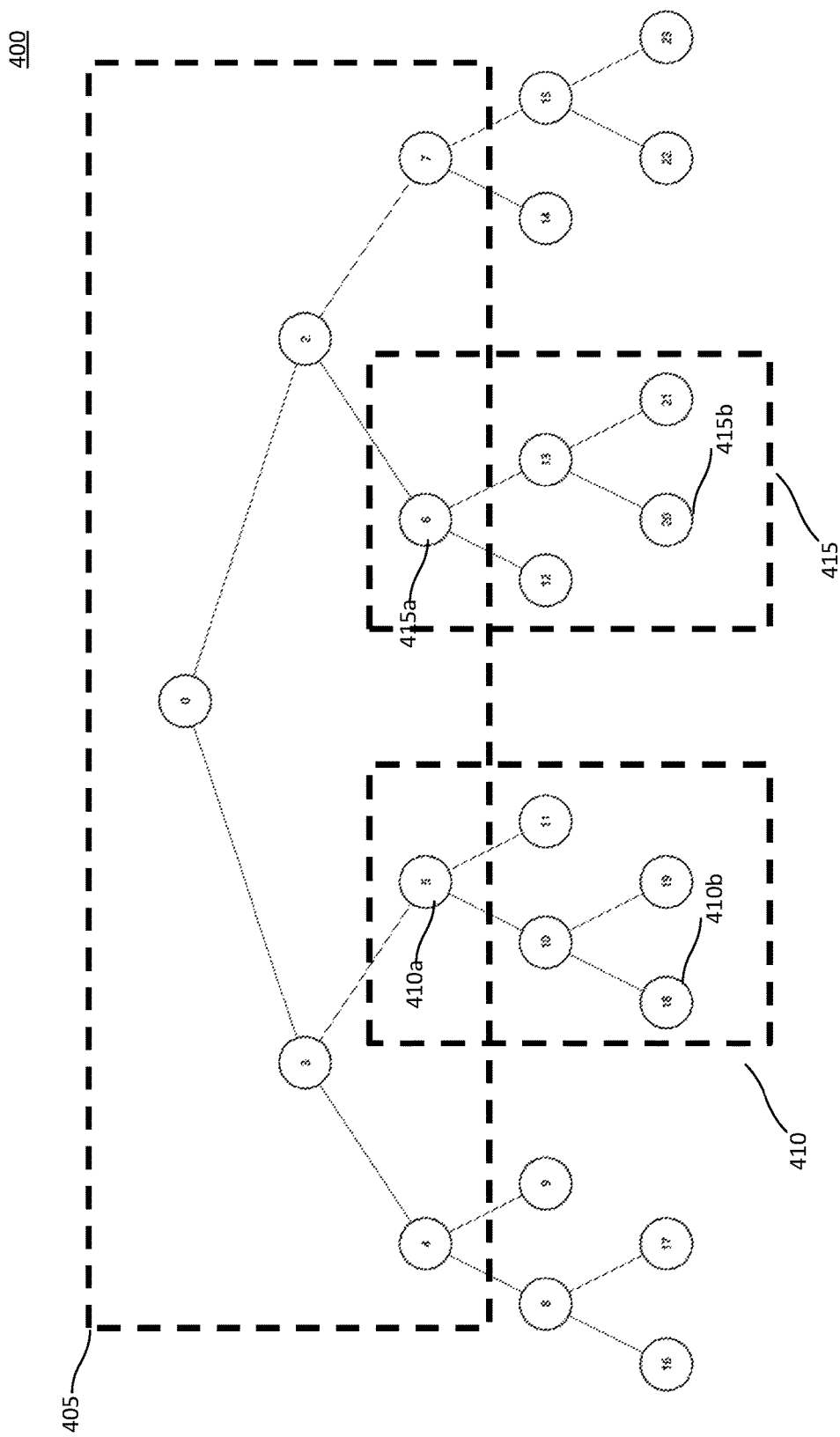
FIG. 4 is a diagram showing a prefix-tree being dividing into smaller sub-areas.

FIG. 4 is a diagram showing an example of a prefix-tree being dividing into smaller sub-areas. The sub-tries 405, 410, and 415 are derived from a full trie 400 of topics. As described previously, all topics of the knowledge base 220 (e.g., names of all the topics) can be stored as a trie such as the trie 400. The full trie may be stored in a topic suggestion datastore such as the topic suggestion datastore 215 of FIG. 2, it may be stored in the knowledge base 220 or it may be stored in a separate data store. In some implementations, the topic suggestion service 110 is configured to retrieve the full trie 400 in order to perform topics searches and provide recommendations. However, retrieving and processing the full trie each time a topic recommendation is needed via a network such as the Internet, however, can cause several technical problems, including over-loaded internet traffic and excessive computational burden on the computational devices (e.g., servers) that perform the topic suggestion services. To avoid this, the full trie may be divided into several sub-tries as illustrated in the example of trie 400 and each sub-trie may be processed separately to simplify the search scope. In some implementations, multiple computing resources such as GPUs are used to provide parallel computing capacity that allows topic search tasks in each sub-trie to be carried out simultaneously. In some examples, some of the GPUs are located in the client device that submits the request for performing topic searches. In other examples, the GPUs are included in one or more remote servers associated.

In some implementations, to divide the full trie 400 into multiple sub-tries, a first sub-trie 405 is selected from the top part of the trie 400 and sent to a first computing device for processing to narrow down the search scope from the full trie 400. When the topic suggestion service 110 receives a request from the client device 105 of the user, for example, two candidate nodes 410a and 415a in the trie 405 will then be identified based on the inserted textual context 305, inserted textual characters 340, or other search information included in the request. At this point, the two candidate nodes 410a and 415a still represent incomplete topics in the trie 400. However, based on the two candidate nodes 410a and 415a, two corresponding sub-tries 410 and 415 can be determined accordingly and sent to a computing device for performing topic search tasks. Upon receiving the two corresponding sub-tries 410 and 415, based on the request, further candidate nodes 410b and 415b may be identified accordingly to represent two full-length topics. In this way, only sub-tries 405, 410, and 415 will need to be transmitted for topic searches instead of the full tire 400. Furthermore, the GPUs having parallel computing capacity can perfume each topic search task in different sub-tries simultaneously based on the request. Thus, network traffic and processing time will be reduced with this implementation.

Figure 5A:
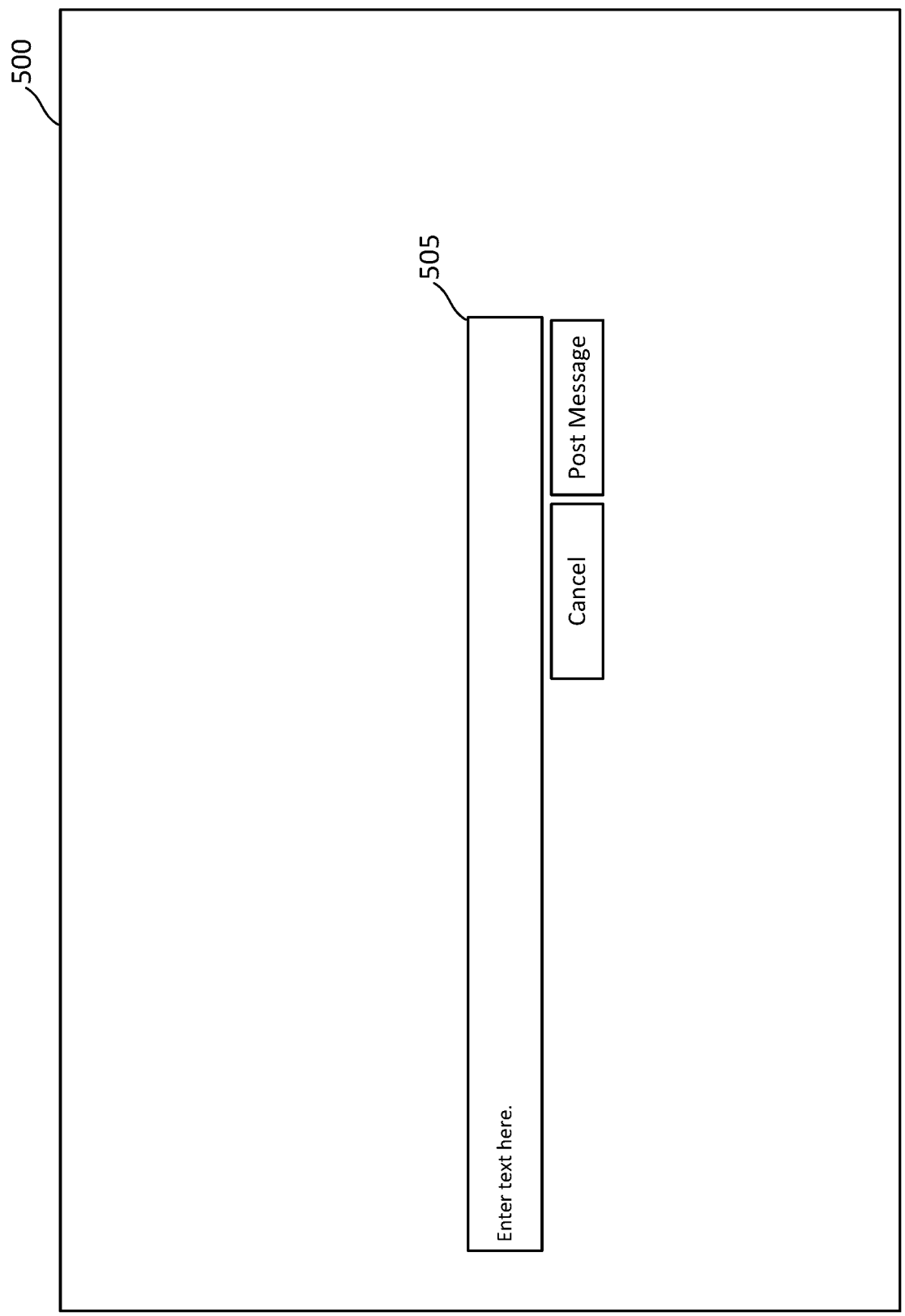
FIGS. 5A-5E are diagrams showing example graphical user interfaces of an application in which the topic recommendations are presented to a user using the topic suggestion techniques provided herein.
Figure 5B:
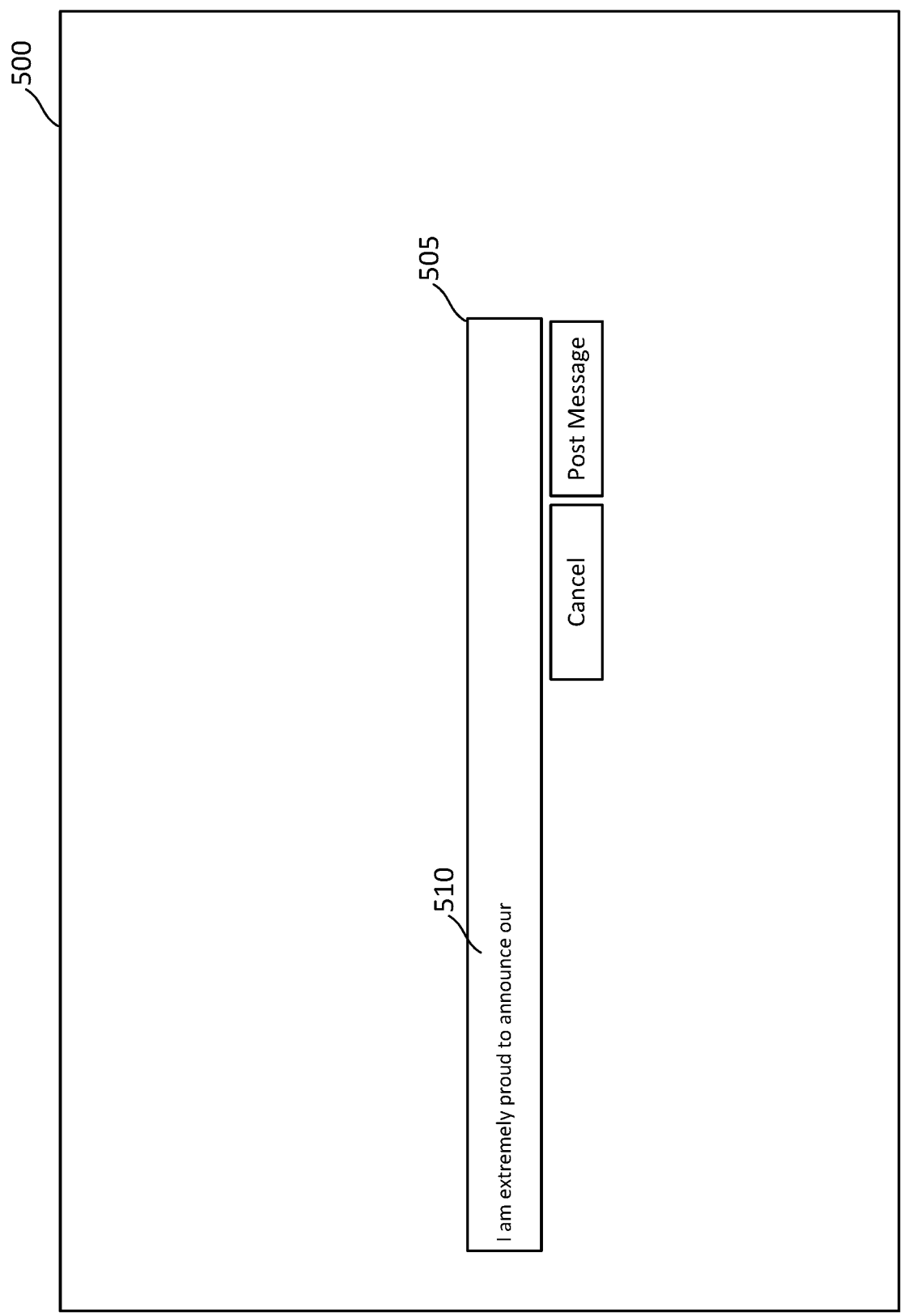
Figure 5C:
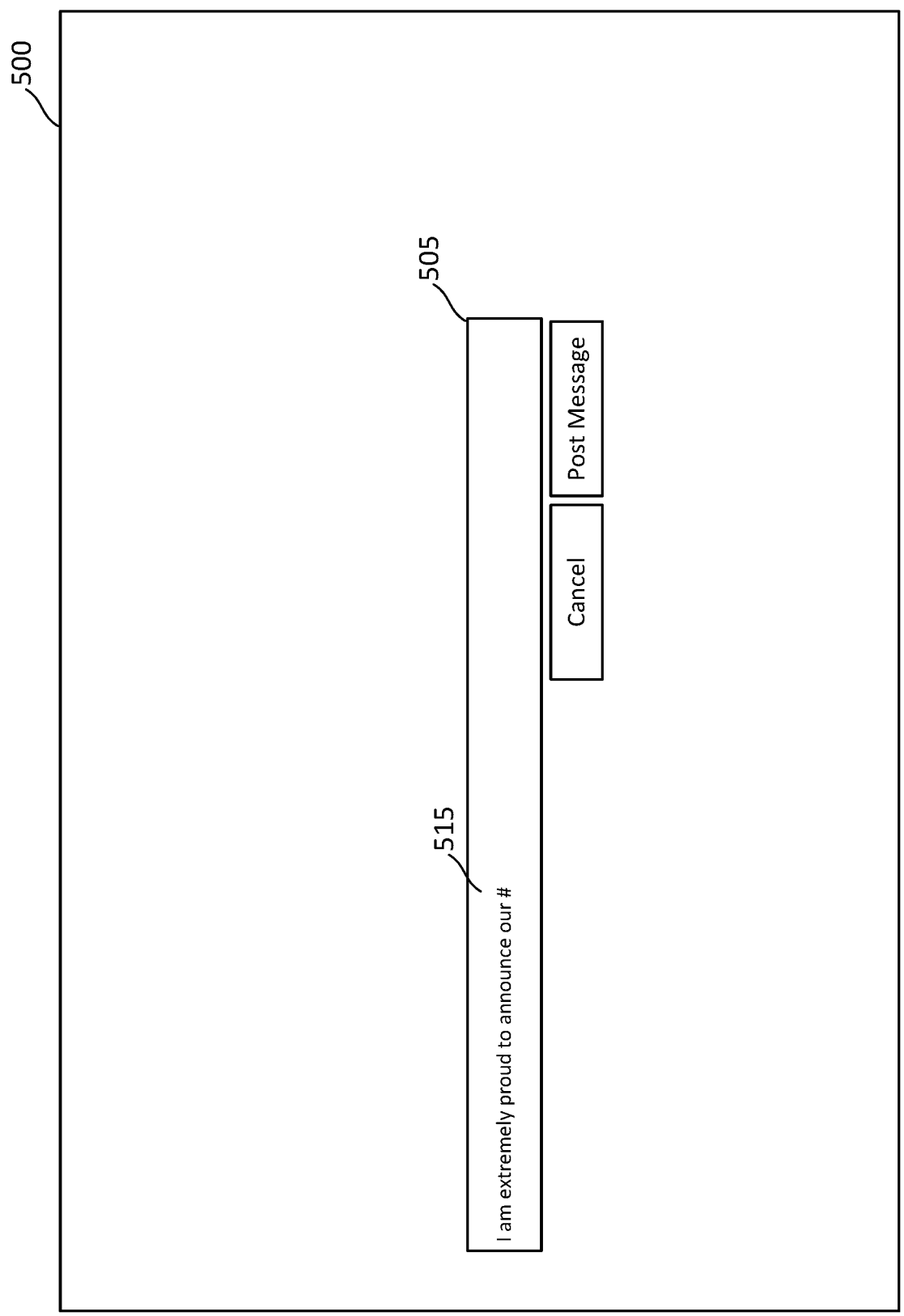
Figure 5D:
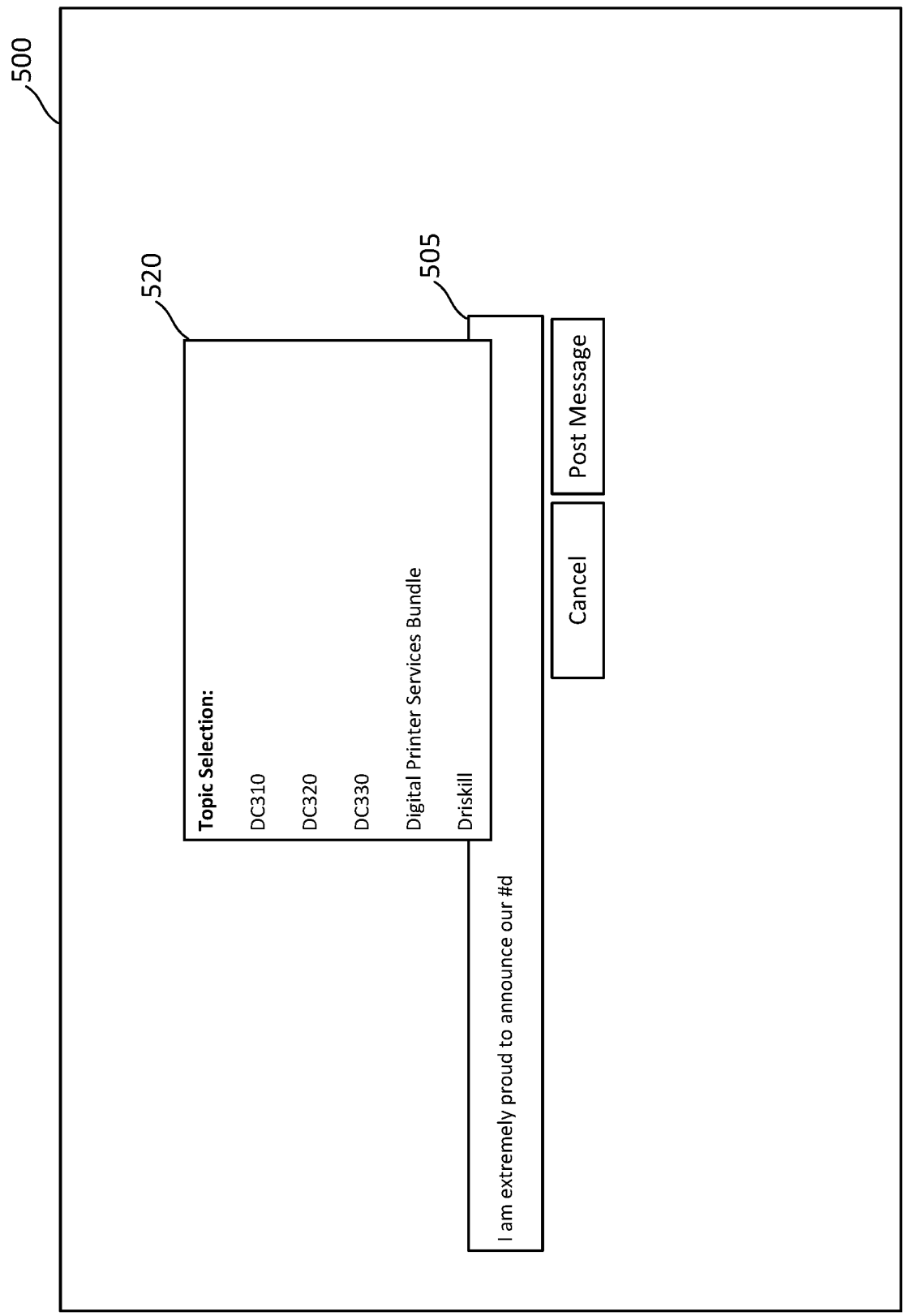
Figure 5E:
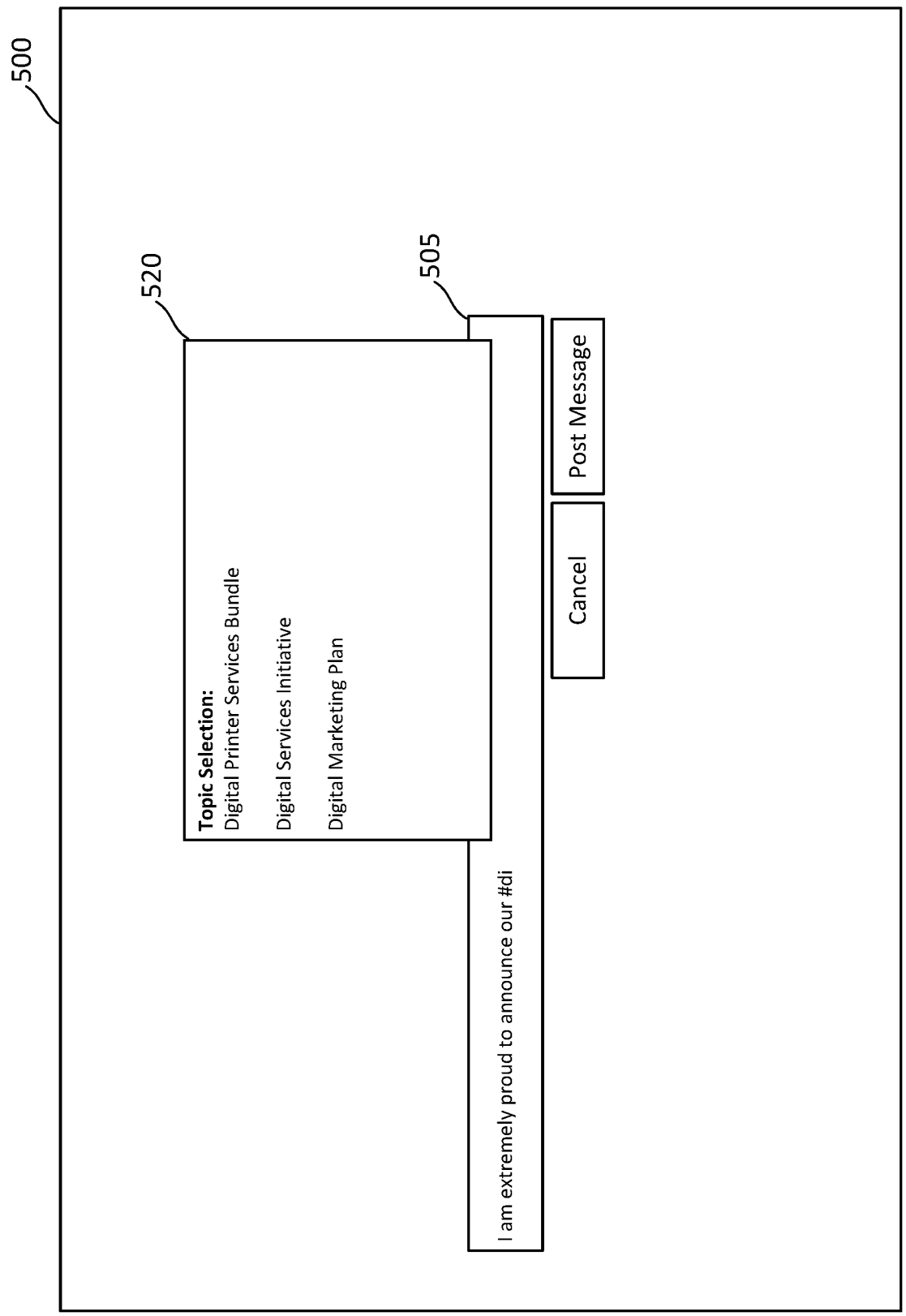

FIGS. 5A-5E are diagrams showing example graphical user interfaces (GUIs) of an application in which topic recommendations are presented to a user using the topic suggestion techniques provided herein. FIG. 5A shows an initial state in which the user has not yet provided any textual context or tag in the user interface (UI) element 505. FIG. 5B depicts a second state in which the user has inserted a textual context 510, "I am extremely proud to announce our" in the UI element 505. FIG. 5C shows a third state in which the user has entered a hashtag ("#") to provide the insertion sequence 515 which indicates that the user intends to add a tag following the inserted textual context. In this implementation, the application has not yet generated and displayed a topic selection item 520 in the GUI 500 from which the user can select a topic from a list of recommended topics. However, in some implementations, topic recommendations that are relevant to the inserted textual context have been generated by the application at this stage using the topic suggestion techniques described in FIG. 3. FIG. 5D depicts a fourth state in which the user has inserted the character "d" followed by the hashtag ("#") to indicate that the user intends to add a tag following the inserted textual context. At this point, the topic recommendations will be updated by the application based on the inserted character "d." Furthermore, topic selection UI element 520 is presented to the user with a list of topics from the updated topic recommendations to enable the user to select a desired topic. FIG. 5E shows a subsequent state in which the user has inserted a next character "i" followed by the character "d" to indicate that the user intends to further refine the list of topics presented in the topic selection UI element 520 based on the inserted characters "di" in combination. As seen in FIG. 5 E, the list of recommended topics has been updated based on inserted characters "di" so that only topics starting with "di" are presented in the topic selection UI element 520. In this manner, the user can select one or more desired topics are associated with the inserted textual context previously typed.

Figure 6A:
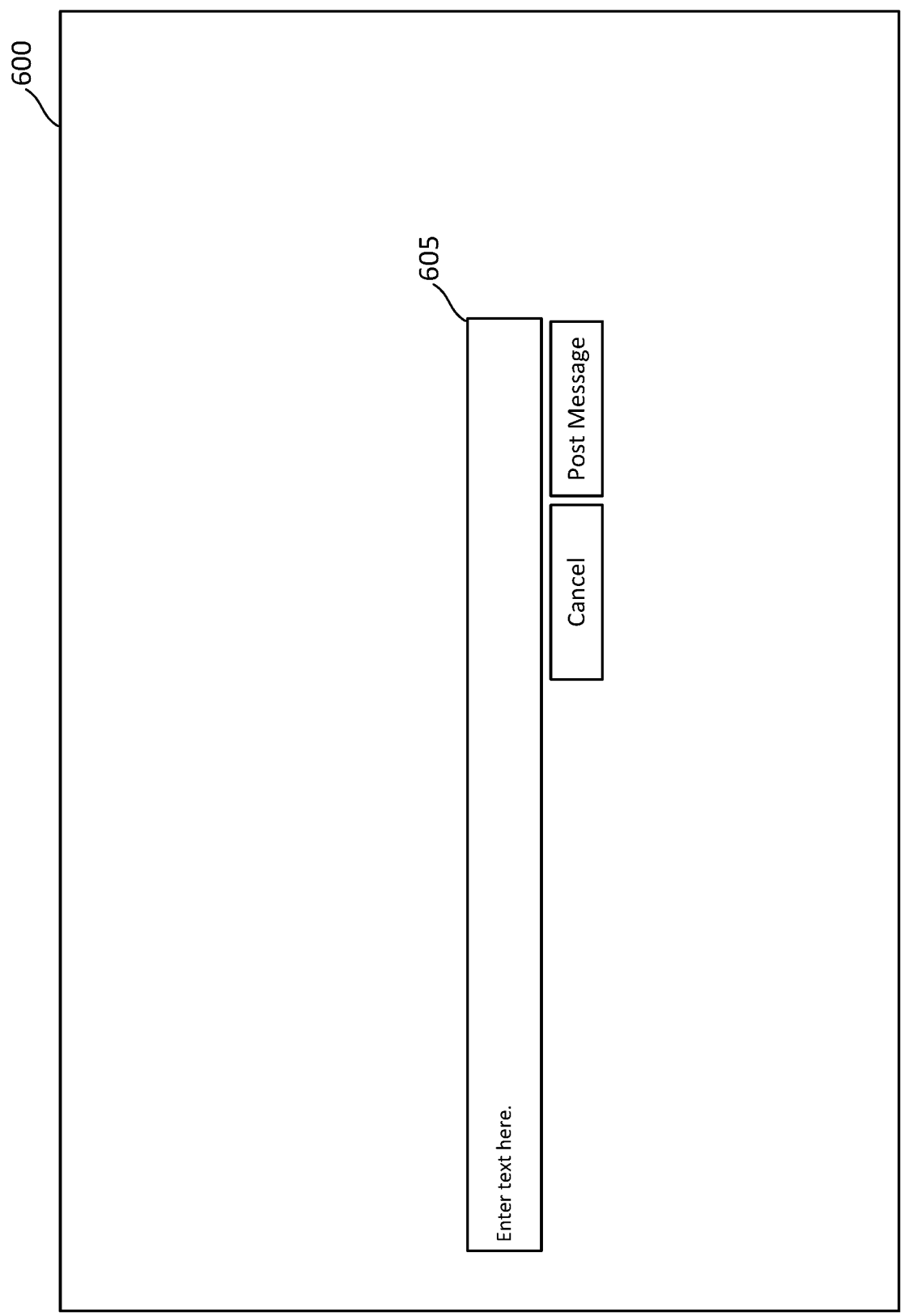
FIGS. 6A-6C are diagrams showing other example graphical user interfaces of an application in which topic recommendations are presented to a user using the topic suggestion techniques provided herein.
Figure 6B:
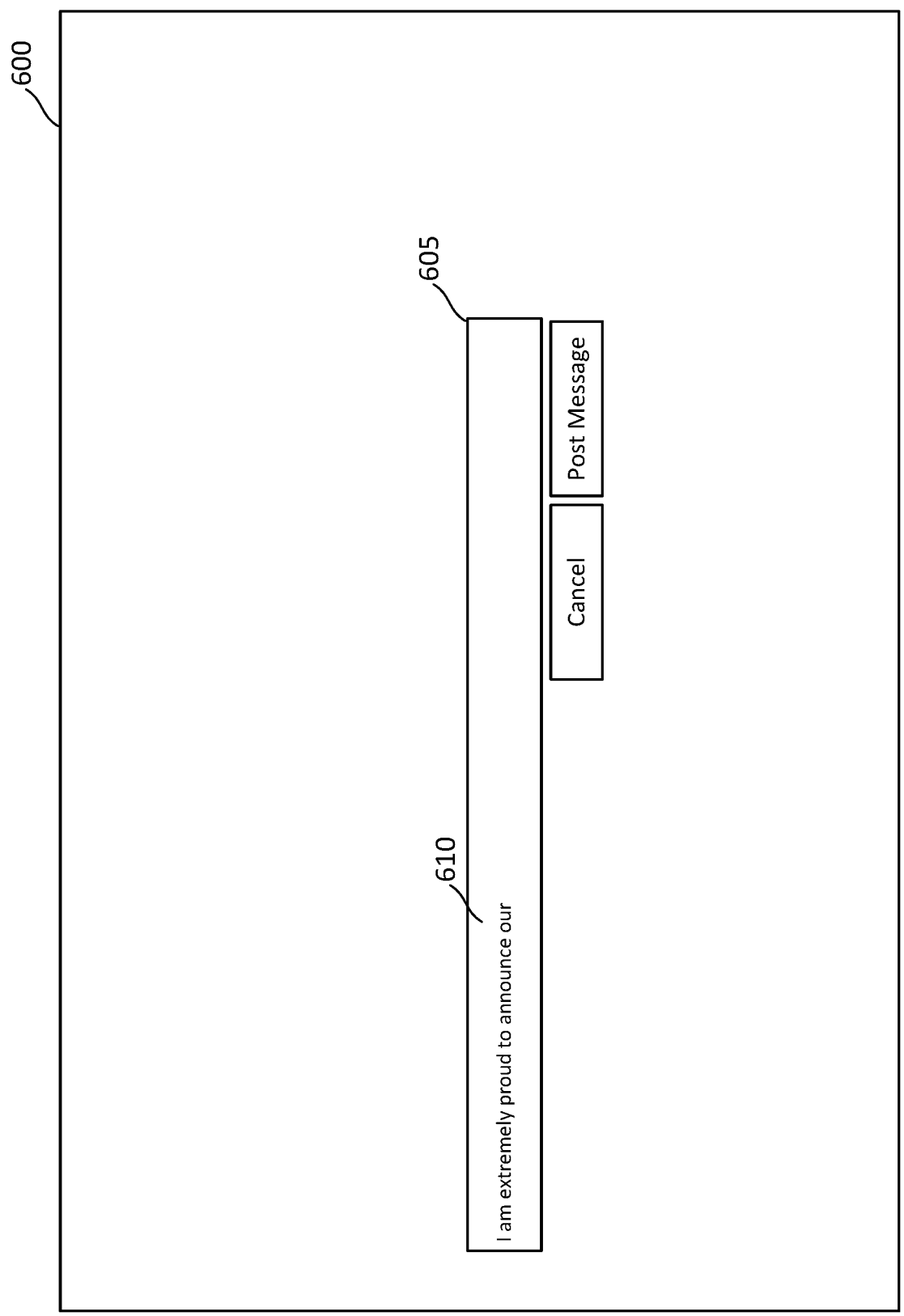
Figure 6C:
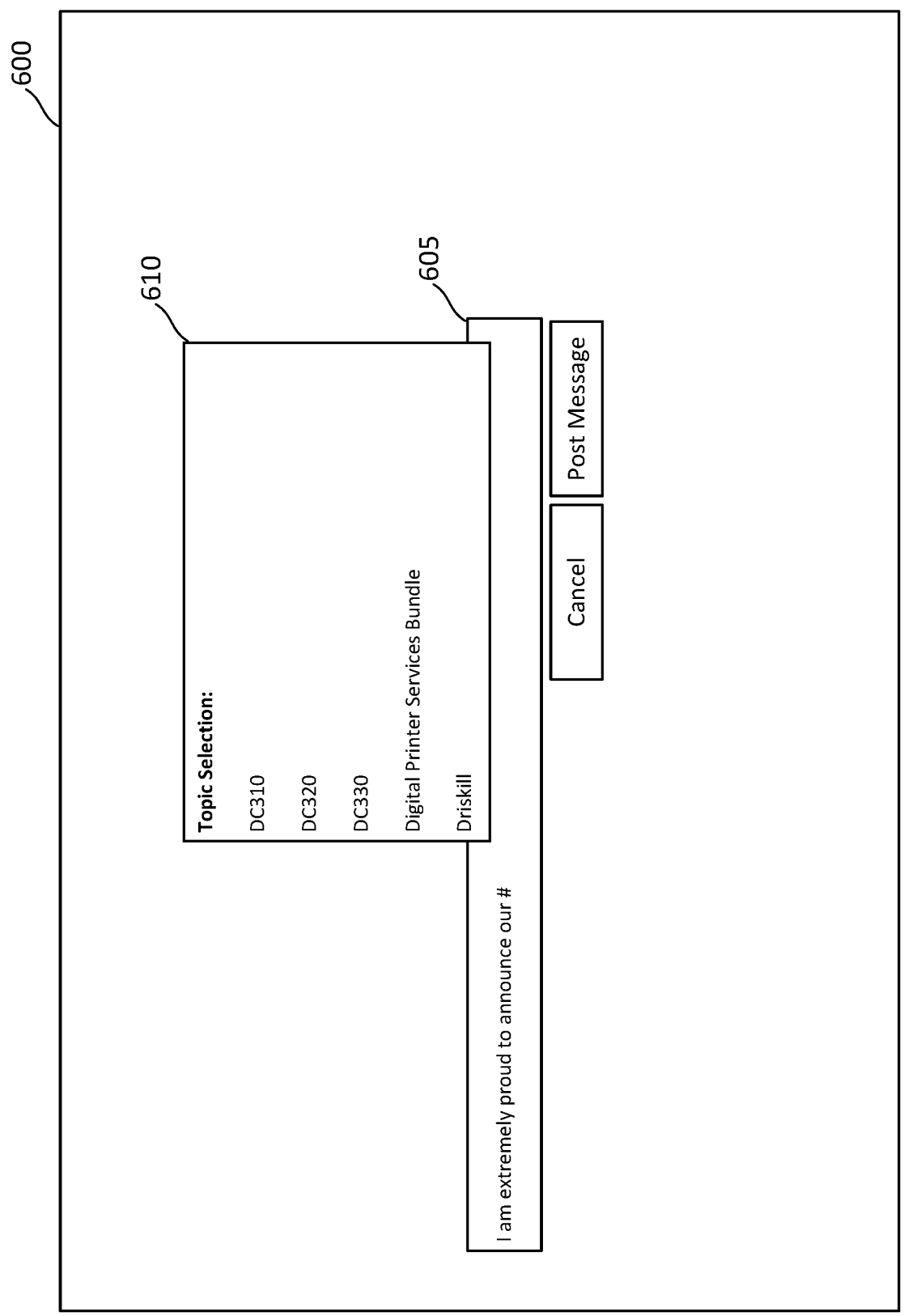

FIGS. 6A-6C depict an example GUI 600, which is similar to the user interface 500 of FIGS. 5A-5E. However, the examples shown in FIGS. 6A-6C implement the techniques for presenting a list of recommended topics to the user before the user inserts a character in a UI element 605 after an inserted the hashtag ("#") indicator. In other words, the topic suggestion techniques disclosed herein can generate topic recommendations based only on the inserted textual context the user provided. FIGS. 6A and 6B are the same as FIGS. 5A and 5B in that they display the first two states in which the user is yet to insert a textual context and then inserts the textual context "I am extremely proud to announce our". FIG. 6C shows a third state in which the user has entered a hashtag ("#") to indicate that the user intends to add a tag following the inserted textual context. In this implementation, the application will then generate and display the topic selection UI element 615 in the user interface 600, where the user can select a topic from a list of recommended topics. In some implementations, the application generates and displays the topic selection item 610 with the list of recommended topics based on a setting of the application indicating that no character insertion after the hashtag ("#") is needed for displaying the topic selection UI element 615. In another implementation, the application generates and displays the topic selection UI element 615 with the list of recommended topics in response to the user's insertion of the indicator and before more characters are inserted after the hashtag indicator. In some implementations, the user expresses an intention for displaying the topic selection UI element 615 without inserting any characters by selecting an entering an enter key, a tab key, or the like. In some examples, the application can be configured to receive the user's voice through voice recognition techniques to identify the user's intention for displaying the topic selection UI element 615.

Figure 7:
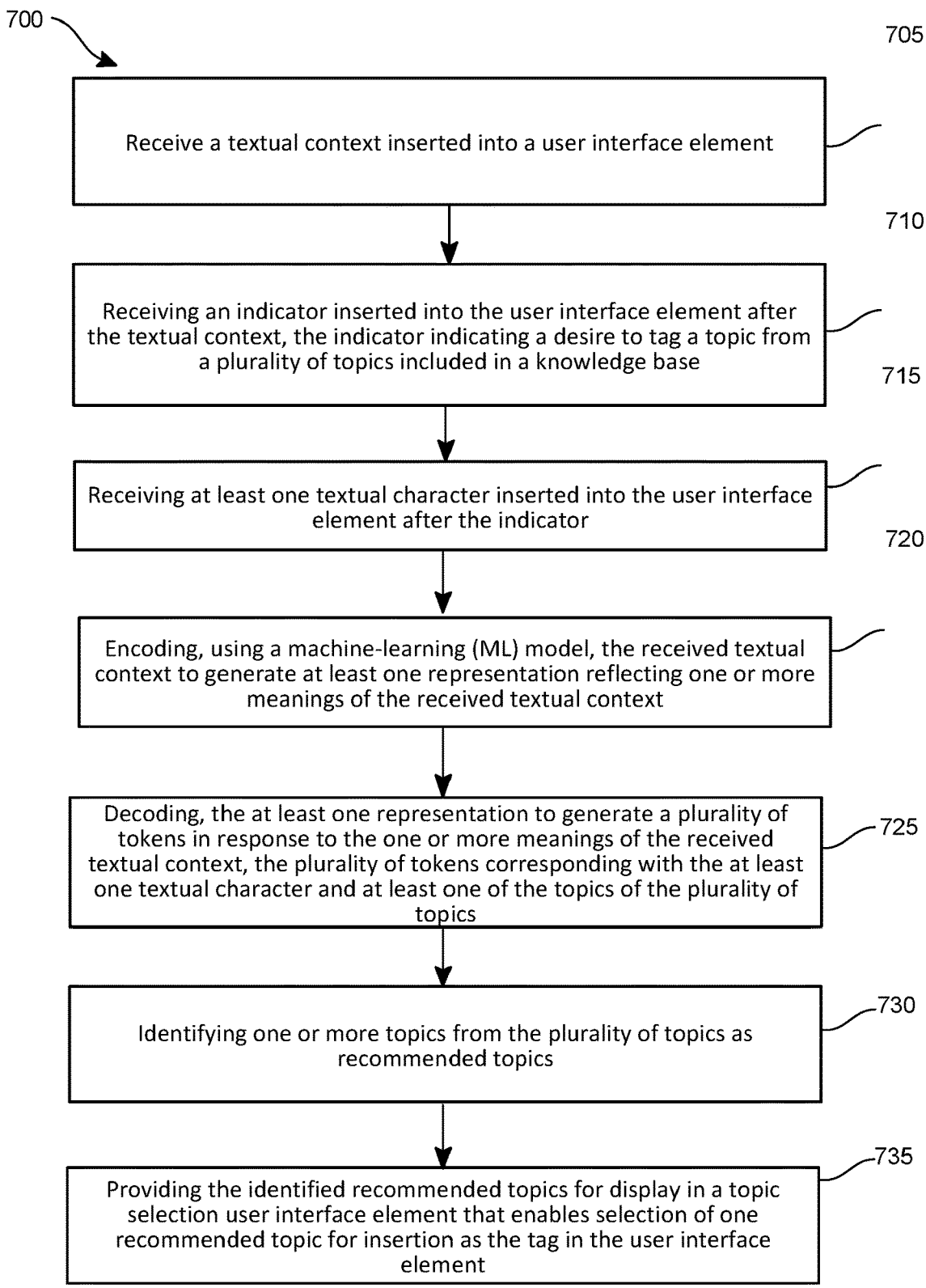
FIG. 7 is a flow chart of an example process for providing topic recommendations from a knowledge base.

FIG. 7 is a flow chart of an example process 700 for providing topic recommendations from a knowledge base. The process 700 can be implemented by the topic suggestion service 110 shown in the preceding examples. The process 700 includes an operation 705 of receiving a textual context that a user inserted into a UI element. For example, the user may insert a textual context into an input box displayed by an application. After receiving the textual context, the process 700 proceeds to receive an indicator inserted into the UI element after the contextual context during operation 710. The indicator indicates that the user intends to tag a topic from among a plurality of topics in a knowledge base. The indicator may be a hashtag or another character that indicates a desire to tag a topic. The knowledge base may be an organization-based knowledge base for an organization associated with the user (e.g., the user is an employee of the organization). The knowledge base may also be a public knowledge base accessible publicly to a plurality of users. Each tag represents a topic in the knowledge base and may be a name for the topic. In some implementations, the application enables the user to insert one or more characters after the indicator to provide on or more first characters of the tag associated with their topic of interest. As such, the process 700 includes an operation 715 of receiving at least one textual character inserted into the user interface after the indicator. Note that the operation 715 can be optional in some examples, as shown in FIGS. 6A-6C. The application may be an application such as an application provided by the application services 125a and 125b. Example of the textual context being inserted in the UI element are shown in FIGS. 5A-5E and 6A-6C. The hashtag or other indication can cause the application to send a request to the topic suggestion service 110 for topic recommendations.

After receiving the textual context, indicator and at least one textual character, the process 700 includes an operation 720 of encoding, using a ML model, the received textual context to generate one or representations reflecting one or more meanings of the received textual context. The ML model may be a BERT model trained to encode the textual content such that it predicts next characters in a phrase. In some implementations, the machine-learning model is trained by natural language processing algorithms using the knowledge base as a training dataset. The process 700 also includes decoding, using a decoder portion of the ML model the one or representations to generate a plurality of tokens in response to the one or more meanings of the received textual context, the plurality of tokens corresponding with the at least one textual character and at least one of the topics of the plurality of topics. This may involve using a prefix tree data structure that represents the topics in the knowledge base. In addition, it may include using a prefix tree data structure that represents the textual characters inserted after the indicator. Operation 700 also includes identifying one or more topics from the plurality of topics as recommended topics. Once the recommended topics are identified, the operation 700 includes providing the identified recommended topics for display in a topic selection user interface element that enables selection of one recommended topic for insertion as the tag in the user interface element. Examples of a set of topic recommendations being presented to a user is shown in FIGS. 5C-5E and 6C-6C.

The detailed examples of systems, devices, and techniques described in connection with FIGS. 1-7 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-7 are implemented in respective modules, which can also be referred to as, and/or include, logic, components, units, and/or mechanisms. Modules can constitute either software modules (for example, code embodied on a machine-readable medium) or hardware modules.

In some examples, a hardware module can be implemented mechanically, electronically, or with any suitable combination thereof. For example, a hardware module can include dedicated circuitry or logic that is configured to perform certain operations. For example, a hardware module can include a special-purpose processor, such as a field-programmable gate array (FPGA) or an Application Specific Integrated Circuit (ASIC). A hardware module can also include programmable logic or circuitry that is temporarily configured by software to perform certain operations and can include a portion of machine-readable medium data and/or instructions for such configuration. For example, a hardware module can include software encompassed within a programmable processor configured to execute a set of software instructions. It will be appreciated that the decision to implement a hardware module mechanically, in dedicated and permanently configured circuitry, or in temporarily configured circuitry (for example, configured by software) can be driven by cost, time, support, and engineering considerations.

Accordingly, the phrase "hardware module" should be understood to encompass a tangible entity capable of performing certain operations and can be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor can be configured as respectively different special-purpose processors (for example, including different hardware modules) at different times. Software can accordingly configure a processor or processors, for example, to constitute a particular hardware module at one instance of time and to constitute a different hardware module at a different instance of time. A hardware module implemented using one or more processors can be referred to as being "processor implemented" or "computer implemented."

Hardware modules can provide information to, and receive information from, other hardware modules. Accordingly, the described hardware modules can be regarded as being communicatively coupled. Where multiple hardware modules exist contemporaneously, communications can be achieved through signal transmission (for example, over appropriate circuits and buses) between or among two or more of the hardware modules. In embodiments in which multiple hardware modules are configured or instantiated at different times, communications between such hardware modules can be achieved, for example, through the storage and retrieval of information in memory devices to which the multiple hardware modules have access. For example, one hardware module can perform an operation and store the output in a memory device, and another hardware module can then access the memory device to retrieve and process the stored output.

In some examples, at least some of the operations of a method can be performed by one or more processors or processor-implemented modules. Moreover, the one or more processors can also operate to support performance of the relevant operations in a "cloud computing" environment or as a "software as a service" (SaaS). For example, at least some of the operations can be performed by, and/or among, multiple computers (as examples of machines including processors), with these operations being accessible via a network (for example, the Internet) and/or via one or more software interfaces (for example, an application program interface (API)). The performance of certain of the operations can be distributed among the processors, not only residing within a single machine, but deployed across several machines. Processors or processor-implemented modules can be in a single geographic location (for example, within a home or office environment, or a server farm), or can be distributed across multiple geographic locations.

Figure 8:
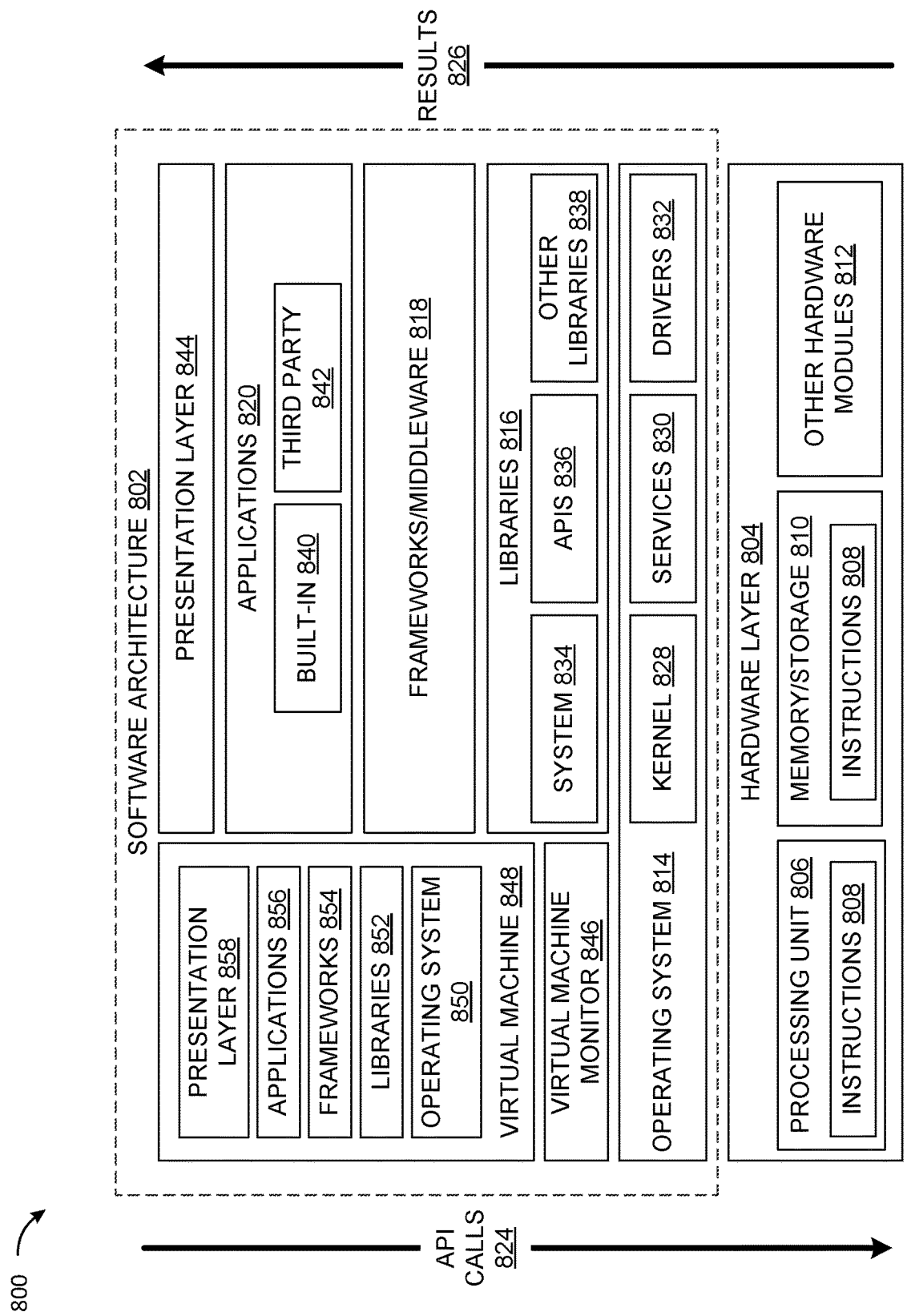
FIG. 8 is a block diagram showing an example software architecture, various portions of which can be used in conjunction with various hardware architectures herein described, which can implement any of the described features

FIG. 8 is a block diagram 800 illustrating an example software architecture 802, various portions of which can be used in conjunction with various hardware architectures herein described, which can implement any of the above-described features. FIG. 8 is a non-limiting example of a software architecture, and it will be appreciated that many other architectures can be implemented to facilitate the functionality described herein. The software architecture 802 can execute on hardware such as a machine 900 of FIG. 9 that includes, among other things, processors 910, memory 930, and input/output (I/O) components 950. A representative hardware layer 804 is illustrated and can represent, for example, the machine 900 of FIG. 9. The representative hardware layer 804 includes a processing unit 806 and associated executable instructions 808. The executable instructions 808 represent executable instructions of the software architecture 802, including implementation of the methods, modules and so forth described herein. The hardware layer 804 also includes a memory/storage 810, which also includes the executable instructions 808 and accompanying data. The hardware layer 804 can also include other hardware modules 812. Instructions 808 held by processing unit 806 can be portions of instructions 808 held by the memory/storage 810.

The example software architecture 802 can be conceptualized as layers, each providing various functionality. For example, the software architecture 802 can include layers and components such as an operating system (OS) 814, libraries 816, frameworks 818, applications 820, and a presentation layer 844. Operationally, the applications 820 and/or other components within the layers can invoke API calls 824 to other layers and receive corresponding results 826. The layers illustrated are representative in nature and other software architectures can include additional or different layers. For example, some mobile or special purpose operating systems cannot provide the frameworks/middleware 818.

The OS 814 can manage hardware resources and provide common services. The OS 814 can include, for example, a kernel 828, services 830, and drivers 832. The kernel 828 can act as an abstraction layer between the hardware layer 804 and other software layers. For example, the kernel 828 can be responsible for memory management, processor management (for example, scheduling), component management, networking, security settings, and so on. The services 830 can provide other common services for the other software layers. The drivers 832 can be responsible for controlling or interfacing with the underlying hardware layer 804. For instance, the drivers 832 can include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 816 can provide a common infrastructure that can be used by the applications 820 and/or other components and/or layers. The libraries 816 typically provide functionality for use by other software modules to perform tasks, rather than rather than interacting directly with the OS 814. The libraries 816 can include system libraries 834 (for example, C standard library) that can provide functions such as memory allocation, string manipulation, file operations. In addition, the libraries 816 can include API libraries 836 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that can provide web browsing functionality). The libraries 816 can also include a wide variety of other libraries 838 to provide many functions for applications 820 and other software modules.

The frameworks 818 (also sometimes referred to as middleware) provide a higher-level common infrastructure that can be used by the applications 820 and/or other software modules. For example, the frameworks 818 can provide various graphic user interface (GUI) functions, high-level resource management, or high-level location services. The frameworks 818 can provide a broad spectrum of other APIs 836 for applications 820 and/or other software modules.

The applications 820 include built-in applications 840 and/or third-party applications 842. Examples of built-in applications 840 can include, but are not limited to, a contacts application, a browser application, a location application, a media application, a messaging application, and/or a game application. Third-party applications 842 can include any applications developed by an entity other than the vendor of the particular platform. The applications 820 can use functions available via OS 814, libraries 816, frameworks 818, and presentation layer 844 to create user interfaces to interact with users.

Some software architectures use virtual machines, as illustrated by a virtual machine 848. The virtual machine 848 provides an execution environment where applications/modules can execute as if they were executing on a hardware machine (such as the machine 900 of FIG. 9, for example). The virtual machine 848 can be hosted by a host OS (for example, OS 814) or hypervisor, and can have a virtual machine monitor 846 which manages operation of the virtual machine 848 and interoperation with the host operating system. A software architecture, which can be different from software architecture 802 outside of the virtual machine, executes within the virtual machine 848 such as an OS 850, libraries 852, frameworks 854, applications 856, and/or a presentation layer 858.

Figure 9:
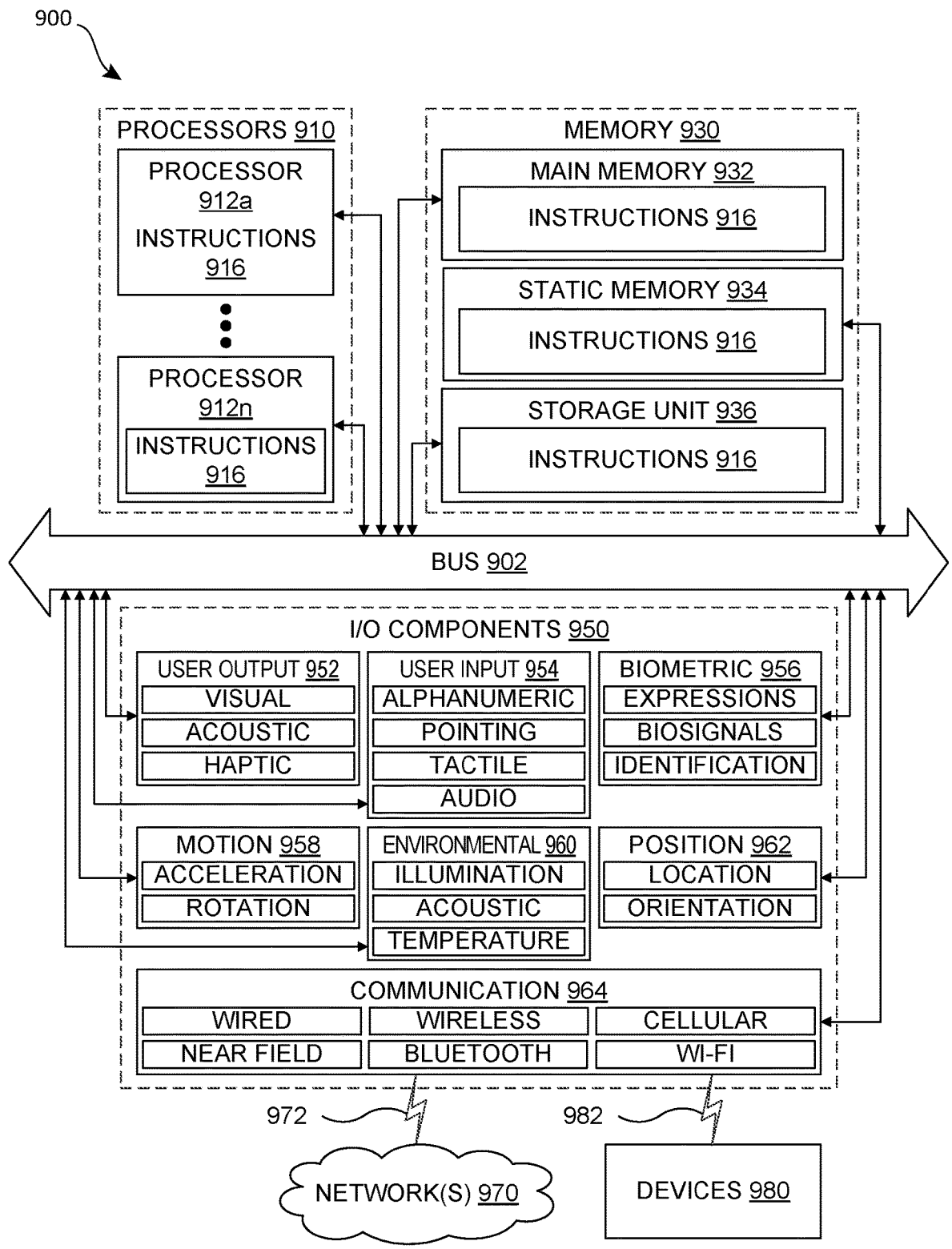
FIG. 9 is a block diagram showing components of an example machine configured to read instructions from a machine-readable medium and perform any of the features described herein.

FIG. 9 is a block diagram illustrating components of an example machine 900 configured to read instructions from a machine-readable medium (for example, a machine-readable storage medium) and perform any of the features described herein. The example machine 900 is in a form of a computer system, within which instructions 916 (for example, in the form of software components) for causing the machine 900 to perform any of the features described herein can be executed. As such, the instructions 916 can be used to implement modules or components described herein. The instructions 916 cause unprogrammed and/or unconfigured machine 900 to operate as a particular machine configured to carry out the described features. The machine 900 can be configured to operate as a standalone device or can be coupled (for example, networked) to other machines. In a networked deployment, the machine 900 can operate in the capacity of a server machine or a client machine in a server-client network environment, or as a node in a peer-to-peer or distributed network environment. Machine 900 can be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 900 is illustrated, the term "machine" includes a collection of machines that individually or jointly execute the instructions 916.

The machine 900 can include processors 910, memory 930, and I/O components 950, which can be communicatively coupled via, for example, a bus 902. The bus 902 can include multiple buses coupling various elements of machine 900 via various bus technologies and protocols. In an example, the processors 910 (including, for example, a central processing unit (CPU), a graphics processing unit (GPU), a digital signal processor (DSP), an ASIC, or a suitable combination thereof) can include one or more processors 912a to 912n that can execute the instructions 916 and process data. In some examples, one or more processors 910 can execute instructions provided or identified by one or more other processors 910. The term "processor" includes a multi-core processor including cores that can execute instructions contemporaneously. Although FIG. 9 shows multiple processors, the machine 900 can include a single processor with a single core, a single processor with multiple cores (for example, a multi-core processor), multiple processors each with a single core, multiple processors each with multiple cores, or any combination thereof. In some examples, the machine 900 can include multiple processors distributed among multiple machines.

The memory/storage 930 can include a main memory 932, a static memory 934, or other memory, and a storage unit 936, both accessible to the processors 910 such as via the bus 902. The storage unit 936 and memory 932, 934 store instructions 916 embodying any one or more of the functions described herein. The memory/storage 930 can also store temporary, intermediate, and/or long-term data for processors 910. The instructions 916 can also reside, completely or partially, within the memory 932, 934, within the storage unit 936, within at least one of the processors 910 (for example, within a command buffer or cache memory), within memory at least one of I/O components 950, or any suitable combination thereof, during execution thereof. Accordingly, the memory 932, 934, the storage unit 936, memory in processors 910, and memory in I/O components 950 are examples of machine-readable media.

As used herein, "machine-readable medium" refers to a device able to temporarily or permanently store instructions and data that cause machine 900 to operate in a specific fashion, and can include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 916) for execution by a machine 900 such that the instructions, when executed by one or more processors 910 of the machine 900, cause the machine 900 to perform and one or more of the features described herein. Accordingly, a "machine-readable medium" can refer to a single storage device, as well as "cloud-based" storage systems or storage networks that include multiple storage apparatus or devices. The term "machine-readable medium" excludes signals per se.

The I/O components 950 can include a wide variety of hardware components adapted to receive input, provide output, produce output, transmit information, exchange information, capture measurements, and so on. The specific I/O components 950 included in a particular machine will depend on the type and/or function of the machine. For example, mobile devices such as mobile phones can include a touch input device, whereas a headless server or IoT device can not include such a touch input device. The particular examples of I/O components illustrated in FIG. 9 are in no way limiting, and other types of components can be included in machine 900. The grouping of I/O components 950 are merely for simplifying this discussion, and the grouping is in no way limiting. In various examples, the I/O components 950 can include user output components 952 and user input components 954. User output components 952 can include, for example, display components for displaying information (for example, a liquid crystal display (LCD) or a projector), acoustic components (for example, speakers), haptic components (for example, a vibratory motor or force-feedback device), and/or other signal generators. User input components 954 can include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 950 can include biometric components 956, motion components 958, environmental components 960, and/or position components 962, among a wide array of other physical sensor components. The biometric components 956 can include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 958 can include, for example, acceleration sensors (for example, an accelerometer) and rotation sensors (for example, a gyroscope). The environmental components 960 can include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that can provide indications, measurements, or signals corresponding to a surrounding physical environment. The position components 962 can include, for example, location sensors (for example, a Global Position System (GPS) receiver), altitude sensors (for example, an air pressure sensor from which altitude can be derived), and/or orientation sensors (for example, magnetometers).

The I/O components 950 can include communication components 964, implementing a wide variety of technologies operable to couple the machine 900 to network(s) 970 and/or device(s) 980 via respective communicative couplings 972 and 982. The communication components 964 can include one or more network interface components or other suitable devices to interface with the network(s) 970. The communication components 964 can include, for example, components adapted to provide wired communication, wireless communication, cellular communication, Near Field Communication (NFC), Bluetooth communication, Wi-Fi, and/or communication via other modalities. The device(s) 980 can include other machines or various peripheral devices (for example, coupled via USB).

In some examples, the communication components 964 can detect identifiers or include components adapted to detect identifiers. For example, the communication components 964 can include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information can be determined based on information from the communication components 962, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment can be used in combination with or substituted for any other feature or element in any other embodiment unless specifically restricted. Therefore, it will be understood that any of the features shown and/or discussed in the present disclosure can be implemented together in any suitable combination. Accordingly, the embodiments are not to be restricted except in light of the attached claims and their equivalents. Also, various modifications and changes can be made within the scope of the attached claims.

In the foregoing detailed description, numerous specific details are set forth by way of examples in order to provide a thorough understanding of the relevant teachings. However, it should be apparent that the present teachings can be practiced without such details. In other instances, well known methods, procedures, components, and/or circuitry have been described at a relatively high-level, without detail, in order to avoid unnecessarily obscuring aspects of the present teachings.

While the foregoing has described what are considered to be the best mode and/or other examples, it is understood that various modifications can be made therein and that the subject matter disclosed herein can be implemented in various forms and examples, and that the teachings can be applied in numerous applications, only some of which have been described herein. It is intended by the following claims to claim any and all applications, modifications and variations that fall within the true scope of the present teachings.

In the following, further features, characteristics and advantages of the invention will be described by means of items:

Item 1. A data processing system comprising:
a processor; and
a memory in communication with the processor, the memory comprising executable instructions that, when executed by the processor, cause the data processing system to perform functions of:
receiving a textual context inserted into a user interface element;
receiving an indicator inserted into the user interface element after the textual context, the indicator indicating a desire to tag a topic from a plurality of topics included in a knowledge base;
receiving at least one textual character inserted into the user interface element after the indicator;
encoding, using a machine-learning (ML) model, the received textual context to generate at least one representation reflecting one or more meanings of the received textual context;

decoding, using the ML model, the at least one representation to generate a plurality of tokens in response to the one or more meanings of the received textual context, the plurality of tokens corresponding with the at least one textual character and at least one of the topics of the plurality of topics;

identifying one or more topics from the plurality of topics as recommended topics; and providing the identified recommended topics for display in a topic selection user interface element that enables selection of one recommended topic for insertion as the tag in the user interface element.

Item 2. The data processing system of claim 1, wherein generating the plurality of tokens includes utilizing a prefix tree data structure representing the plurality of topics in the knowledge base.

Item 3. The data processing system of item 2, wherein generating the plurality of tokens further includes generating tokens that match the at least one textual characters.

Item 4. The data processing system of item 2, wherein the prefix tree is divided into sub-areas.

Item 5. The data processing system of item 4, wherein the knowledge base comprises an organization-based knowledge base associated with a user utilizing the user interface element.

Item 6. The data processing system of item 5, wherein the knowledge base is stored in a storage medium associated with the organization.

Item 7. The data processing system of item 6, wherein at least one of the sub-areas is transferred between the storage medium and one or more computing devices that execute the ML model as processing requires.

Item 8. A method implemented in a data processing system for providing topic recommendations, the method comprising:

receiving a textual context inserted into a user interface element;

receiving an indicator inserted into the user interface element after the textual context, the indicator indicating a desire to tag a topic from a plurality of topics included in a knowledge base;

receiving at least one textual character inserted into the user interface element after the indicator;

providing the textual context, the at least one character and a prefix tree data structure representing the plurality of topics as inputs to a trained machine-learning (ML) model;

receiving as an output of the trained ML model one or more topics from the plurality of topics as identified recommended topics; and providing the identified recommended topics for display in a topic selection user interface element that enables selection of one recommended topic for insertion as the tag in the user interface element.

Item 9. The method of item 8, wherein the ML model performs functions of:

encoding the received textual context to generate at least one representation reflecting one or more meanings of the received textual context;

decoding the at least one representation to generate a plurality of tokens in response to the one or more meanings of the received textual context, the plurality of tokens corresponding with the at least one textual character and at least one of the topics of the plurality of topics; and identifying one or more topics from the plurality of topics as recommended topics.

Item 10. The method of item 9, wherein generating the plurality of tokens includes utilizing the prefix tree data structure representing the plurality of topics in the knowledge base.

Item 11. The method of item 10, wherein generating the plurality of tokens further includes generating tokens that match the at least one textual characters Item 12. The method of any of items 8-11, wherein the knowledge base comprises an organization-based knowledge base associated with a user utilizing the user interface element.

Item 13. The method of item 12, wherein the prefix tree is divided into sub-areas.

Item 14. The method of item 13, wherein the knowledge base is stored in a storage medium associated with the organization.

Item 15. The method of item 14, wherein at least one of the sub-areas is transferred between the storage medium and one or more computing devices that execute the ML model as processing requires.

Item 16. A machine-readable medium on which are stored instructions that, when executed, cause a processor of a programmable device to perform functions of:

receiving a textual context inserted into a user interface element;

receiving an indicator inserted into the user interface element after the textual context, the indicator indicating a desire to tag a topic from a plurality of topics included in a knowledge base;

receiving at least one textual character inserted into the user interface element after the indicator;

encoding, using a machine-learning (ML) model, the received textual context to generate at least one representation reflecting one or more meanings of the received textual context;

decoding, using the ML model, the at least one representation to generate a plurality of tokens in response to the one or more meanings of the received textual context, the plurality of tokens corresponding with the at least one textual character and at least one of the topics of the plurality of topics;

identifying one or more topics from the plurality of topics as recommended topics; and providing the identified recommended topics for display in a topic selection user interface element that enables selection of one recommended topic for insertion as the tag in the user interface element.

Item 17. The machine-readable medium of item 16, wherein generating the plurality of tokens includes utilizing a prefix tree data structure representing the plurality of topics in the knowledge base.

Item 18. The machine-readable medium of item 16, wherein generating the plurality of tokens further includes generating tokens that match the at least one textual characters.

Item 19. The machine-readable medium of item 16, where the ML model is a bidirectional encoder representations from transformers (BERT) model.

Item 20. The machine-readable medium of item 16, wherein the knowledge base comprises an organization-based knowledge base associated with a user utilizing the user interface element.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like can be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but can include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a machine-readable medium storing executable instructions that, when executed, cause the processor to perform operations comprising:
detecting a textual context and an indicator inserted into a user interface element after the textual context, the indicator indicating that a topic is to be tagged from a plurality of topics included in a knowledge base containing topic names, topic information, and topic descriptions associated with a tenant of a multi-tenant cloud-based platform, wherein the knowledge base is stored in a persistent datastore and the topic names, topic information, and topic descriptions are derived using machine learning based on content associated with the tenant;
receiving at least one textual character inserted into the user interface element after entry of the indicator;
in response to the detecting and receiving, encoding, using a machine-learning (ML) model, the textual context to generate at least one representation of one or more meanings of the textual context, wherein the ML model is trained with training data derived from the knowledge base;
decoding, using the ML model, the at least one representation to generate a plurality of tokens based on the one or more meanings of the textual context, the plurality of tokens corresponding with the at least one textual character and at least one of the topics of the plurality of topics, wherein the decoding is performed using a combination of a trie data structure and a generative process using the ML model;
identifying one or more topics from the plurality of topics as recommended topics, wherein the identified topics are limited to topics contained in the knowledge base; and
rendering the identified recommended topics in a topic selection user interface element, the topic selection user interface element operable to receive a selection of a recommended topic to be tagged in the user interface element in proximity to the indicator.

2. The data processing system of claim 1, wherein generating the plurality of tokens includes utilizing a prefix tree data structure representing the plurality of topics in the knowledge base.

3. The data processing system of claim 2, wherein generating the plurality of tokens further includes generating tokens that match the at least one textual characters.

4. The data processing system of claim 2, wherein the prefix tree is divided into sub-areas.

5. The data processing system of claim 4, wherein the knowledge base comprises an organization-based knowledge base associated with a user utilizing the user interface element.

6. The data processing system of claim 5, wherein the knowledge base is stored in a storage medium associated with the organization.

7. The data processing system of claim 6, wherein at least one of the sub-areas is transferred between the storage medium and one or more computing devices that execute the ML model as processing requires.

8. A method implemented in a data processing system for providing topic recommendations, the method comprising:
detecting a textual context and an indicator inserted into a user interface element after the textual context, the indicator indicating that a topic is to be tagged from a plurality of topics included in a knowledge base containing topic names, topic information, and topic descriptions associated with a tenant of a multi-tenant cloud-based platform, wherein the knowledge base is stored in a persistent datastore and the topic names, topic information, and topic descriptions are derived using machine learning based on content associated with the tenant;
receiving at least one textual character inserted into the user interface element after entry of the indicator;
in response to the detecting and receiving, providing the textual context, the at least one character and a prefix tree data structure representing the plurality of topics as inputs to a trained machine-learning (ML) model, wherein the ML model is trained with training data derived from the knowledge base;

receiving, as an output of the trained ML model, one or more topics from the plurality of topics as identified recommended topics, wherein the identified topics are limited to topics contained in the knowledge base; and rendering the identified recommended topics in a topic selection user interface element, the topic selection user interface element operable to receive a selection of a recommended topic to be tagged in the user interface element in proximity to the indicator.

9. The method of claim 8, wherein the ML model performs functions of:

encoding the received textual context to generate at least one representation reflecting one or more meanings of the received textual context;

decoding the at least one representation to generate a plurality of tokens in response to the one or more meanings of the received textual context, the plurality of tokens corresponding with the at least one textual character and at least one of the topics of the plurality of topics; and identifying one or more topics from the plurality of topics as recommended topics.

10. The method of claim 9, wherein generating the plurality of tokens includes utilizing the prefix tree data structure representing the plurality of topics in the knowledge base.

11. The method of claim 10, wherein generating the plurality of tokens further includes generating tokens that match the at least one textual characters.

12. The method of claim 8, wherein the knowledge base comprises an organization-based knowledge base associated with a user utilizing the user interface element.

13. The method of claim 12, wherein the prefix tree is divided into sub-areas.

14. The method of claim 13, wherein the knowledge base is stored in a storage medium associated with the organization.

15. The method of claim 14, wherein at least one of the sub-areas is transferred between the storage medium and one or more computing devices that execute the ML model as processing requires.

16. A machine-readable medium on which are stored instructions that, when executed, cause a processor of a programmable device to perform functions of:

detecting a textual context and an indicator inserted into a user interface element after the textual context, the indicator indicating that a topic is to be tagged from a plurality of topics included in a knowledge base containing topic names, topic information, and topic descriptions associated with a tenant of a multi-tenant cloud-based platform, wherein the knowledge base is stored in a persistent datastore and the topic names, topic information, and topic descriptions are derived using machine learning based on content associated with the tenant;

receiving at least one textual character inserted into the user interface element after entry of the indicator;

in response to the detecting and receiving, encoding, using a machine-learning (ML) model, the textual context to generate at least one representation of one or more meanings of the textual context, wherein the ML model is trained with training data derived from the knowledge base;

decoding, using the ML model, the at least one representation to generate a plurality of tokens based on the one or more meanings of the textual context, the plurality of tokens corresponding with the at least one textual character and at least one of the topics of the plurality of topics, wherein the decoding is performed using a combination of a trie data structure and a generative process using the ML model;

identifying one or more topics from the plurality of topics as recommended topics, wherein the identified topics are limited to topics contained in the knowledge base; and rendering the identified recommended topics in a topic selection user interface element, the topic selection user interface element operable to receive a selection of a recommended topic to be tagged in the user interface element in proximity to the indicator.

17. The machine-readable medium of claim 16, wherein generating the plurality of tokens includes utilizing a prefix tree data structure representing the plurality of topics in the knowledge base.

18. The machine-readable medium of claim 16, wherein generating the plurality of tokens further includes generating tokens that match the at least one textual characters.

19. The machine-readable medium of claim 16, where the ML model is a bidirectional encoder representations from transformers (BERT) model.

20. The machine-readable medium of claim 16, wherein the knowledge base comprises an organization-based knowledge base associated with a user utilizing the user interface element.

\* \* \* \* \*